United States Patent
Ning et al.

(10) Patent No.: US 12,516,123 B2
(45) Date of Patent: Jan. 6, 2026

(54) ANTI-PD-L1 ANTIBODY AND PHARMACEUTICAL USE THEREOF

(71) Applicant: HC Biopharma (Shanghai) Co., Ltd., Pudong New Area Shanghai (CN)

(72) Inventors: Jinying Ning, Daxing District Beijing (CN); Hao Peng, Daxing District Beijing (CN); Feng Hao, Daxing District Beijing (CN); Feng He, Daxing District Beijing (CN)

(73) Assignee: HC BIOPHARMA (SHANGHAI) CO., LTD., Shanghai (CN)

( * ) Notice: Subject to any disclaimer, the term of this patent is extended or adjusted under 35 U.S.C. 154(b) by 919 days.

(21) Appl. No.: 17/770,428

(22) PCT Filed: Oct. 21, 2019

(86) PCT No.: PCT/CN2019/112194
§ 371 (c)(1),
(2) Date: Apr. 20, 2022

(87) PCT Pub. No.: WO2021/077250
PCT Pub. Date: Apr. 29, 2021

(65) Prior Publication Data
US 2022/0396624 A1  Dec. 15, 2022

(51) Int. Cl.
*A61P 35/00* (2006.01)
*C07K 16/28* (2006.01)
*A61K 39/00* (2006.01)

(52) U.S. Cl.
CPC .......... *C07K 16/2827* (2013.01); *A61P 35/00* (2018.01); *A61K 2039/505* (2013.01);
(Continued)

(58) Field of Classification Search
CPC ............ C07K 16/2827; C07K 2317/24; C07K 2317/565; C07K 2317/92; C07K 2317/76; A61P 35/00; A61K 2039/505
See application file for complete search history.

(56) References Cited

U.S. PATENT DOCUMENTS 9,205,148 B2 * 12/2015 Langermann ........... A61P 31/00
2018/0346571 A1  12/2018 Gurney et al.

FOREIGN PATENT DOCUMENTS

CN  105331585 A  2/2016
CN  106939047 A  7/2017
(Continued)

OTHER PUBLICATIONS

Notice of Reasons for Rejection issued in corresponding JP Patent Application No. 2022-523657 on Mar. 13, 2023.
(Continued)

*Primary Examiner* — Joanne Hama
*Assistant Examiner* — Hannah Sunshine
(74) *Attorney, Agent, or Firm* — Panitch Schwarze Belisario & Nadel LLP

(57) ABSTRACT

Provided is an antibody molecule or antigen-binding fragment thereof capable of binding to the human PD-L1. Also provided is the use of the antibody molecule or antigen-binding fragment thereof in the preparation of a medicament for treating tumors or cancers. Compared with the existing anti-PD-L1 antibodies, the provided antibody has superior affinity and dissociation rate for PD-L1, lower immunogenicity, and better tumor inhibition effects.

23 Claims, 4 Drawing Sheets
Specification includes a Sequence Listing.

(52) U.S. Cl.
CPC .... *C07K 2317/24* (2013.01); *C07K 2317/565* (2013.01); *C07K 2317/92* (2013.01)

(56) References Cited

FOREIGN PATENT DOCUMENTS

| | | | |
|---|---|---|---|
| CN | 107880127 A | 4/2018 | |
| CN | 108239149 A | 7/2018 | |
| CN | 109776678 A | 5/2019 | |
| CN | 112759647 A * | 5/2021 | ............. A61P 35/00 |
| JP | 2019503687 A | 2/2019 | |
| WO | 2009024531 A1 | 2/2009 | |
| WO | 2017118321 A1 | 7/2017 | |

OTHER PUBLICATIONS

Int'l Search Report issued Jul. 20, 2020 in Int'l Application No. PCT/CN2019/112194.

Burova et al., "Characterization of the Anti-PD-1 Antibody REGN2810 and its Antitumor Activity in Human PD-1 Knock-In Mice," Molecular Cancer Therapeutics, vol. 16, No. 5, pp. 861-870 (2017).

Wang et al., "Action mechanism of PD-1/PD-L1 in immune escape of tumor and its clinical application, " Chinese Journal of Cancer Biotherapy, vol. 24, No. 7, pp. 784-790 (2017) (English Translation Only).

European Search Report issued on Jul. 10, 2023, in corresponding EP Patent Application No. 19949879.1.

* cited by examiner

SEQUENCE LISTING

```
<160> NUMBER OF SEQ ID NOS: 86

<210> SEQ ID NO 1
<211> LENGTH: 334
<212> TYPE: PRT
<213> ORGANISM: Artificial Sequence
<220> FEATURE:
<221> NAME/KEY: PEPTIDE
<222> LOCATION: ()..()
<223> OTHER INFORMATION: CH1-CH3 heavy chain constant region

<400> SEQUENCE: 1

Thr Val Ser Ser Ala Ser Thr Lys Gly Pro Ser Val Phe Pro Leu Ala
1               5                   10                  15

Pro Ser Ser Lys Ser Thr Ser Gly Gly Thr Ala Ala Leu Gly Cys Leu
            20                  25                  30

Val Lys Asp Tyr Phe Pro Glu Pro Val Thr Val Ser Trp Asn Ser Gly
        35                  40                  45

Ala Leu Thr Ser Gly Val His Thr Phe Pro Ala Val Leu Gln Ser Ser
    50                  55                  60

Gly Leu Tyr Ser Leu Ser Ser Val Val Thr Val Pro Ser Ser Ser Leu
65                  70                  75                  80
```

Gly Thr Gln Thr Tyr Ile Cys Asn Val Asn His Lys Pro Ser Asn Thr
                85                  90                  95

Lys Val Asp Lys Lys Val Glu Pro Lys Ser Cys Asp Lys Thr His Thr
            100                 105                 110

Cys Pro Pro Cys Pro Ala Pro Glu Leu Leu Gly Gly Pro Ser Val Phe
        115                 120                 125

Leu Phe Pro Pro Lys Pro Lys Asp Thr Leu Met Ile Ser Arg Thr Pro
    130                 135                 140

Glu Val Thr Cys Val Val Val Asp Val Ser His Glu Asp Pro Glu Val
145                 150                 155                 160

Lys Phe Asn Trp Tyr Val Asp Gly Val Glu Val His Asn Ala Lys Thr
                165                 170                 175

Lys Pro Arg Glu Glu Gln Tyr Asn Ser Thr Tyr Arg Val Val Ser Val
            180                 185                 190

Leu Thr Val Leu His Gln Asp Trp Leu Asn Gly Lys Glu Tyr Lys Cys
        195                 200                 205

Lys Val Ser Asn Lys Ala Leu Pro Ala Pro Ile Glu Lys Thr Ile Ser
    210                 215                 220

Lys Ala Lys Gly Gln Pro Arg Glu Pro Gln Val Tyr Thr Leu Pro Pro
225                 230                 235                 240

Ser Arg Asp Glu Leu Thr Lys Asn Gln Val Ser Leu Thr Cys Leu Val
                245                 250                 255

Lys Gly Phe Tyr Pro Ser Asp Ile Ala Val Glu Trp Glu Ser Asn Gly
            260                 265                 270

Gln Pro Glu Asn Asn Tyr Lys Thr Thr Pro Pro Val Leu Asp Ser Asp
        275                 280                 285

Gly Ser Phe Phe Leu Tyr Ser Lys Leu Thr Val Asp Lys Ser Arg Trp
    290                 295                 300

Gln Gln Gly Asn Val Phe Ser Cys Ser Val Met His Glu Ala Leu His
305                 310                 315                 320

Asn His Tyr Thr Gln Lys Ser Leu Ser Leu Ser Pro Gly Lys
                325                 330

<210> SEQ ID NO 2
<211> LENGTH: 111
<212> TYPE: PRT
<213> ORGANISM: Artificial Sequence
<220> FEATURE:
<221> NAME/KEY: PEPTIDE
<222> LOCATION: ()..()
<223> OTHER INFORMATION: CL1 light chain constant region

<400> SEQUENCE: 2

Leu Glu Ile Lys Arg Thr Val Ala Ala Pro Ser Val Phe Ile Phe Pro
1               5                   10                  15

Pro Ser Asp Glu Gln Leu Lys Ser Gly Thr Ala Ser Val Val Cys Leu
            20                  25                  30

Leu Asn Asn Phe Tyr Pro Arg Glu Ala Lys Val Gln Trp Lys Val Asp
        35                  40                  45

Asn Ala Leu Gln Ser Gly Asn Ser Gln Glu Ser Val Thr Glu Gln Asp
    50                  55                  60

Ser Lys Asp Ser Thr Tyr Ser Leu Ser Ser Thr Leu Thr Leu Ser Lys
65                  70                  75                  80

Ala Asp Tyr Glu Lys His Lys Val Tyr Ala Cys Glu Val Thr His Gln
                85                  90                  95

-continued

Gly Leu Ser Ser Pro Val Thr Lys Ser Phe Asn Arg Gly Glu Cys
                100                 105                 110

<210> SEQ ID NO 3
<211> LENGTH: 290
<212> TYPE: PRT
<213> ORGANISM: Homo sapiens

<400> SEQUENCE: 3

Met Arg Ile Phe Ala Val Phe Ile Phe Met Thr Tyr Trp His Leu Leu
1               5                   10                  15

Asn Ala Phe Thr Val Thr Val Pro Lys Asp Leu Tyr Val Val Glu Tyr
                20                  25                  30

Gly Ser Asn Met Thr Ile Glu Cys Lys Phe Pro Val Glu Lys Gln Leu
            35                  40                  45

Asp Leu Ala Ala Leu Ile Val Tyr Trp Glu Met Glu Asp Lys Asn Ile
    50                  55                  60

Ile Gln Phe Val His Gly Glu Glu Asp Leu Lys Val Gln His Ser Ser
65                  70                  75                  80

Tyr Arg Gln Arg Ala Arg Leu Leu Lys Asp Gln Leu Ser Leu Gly Asn
                85                  90                  95

Ala Ala Leu Gln Ile Thr Asp Val Lys Leu Gln Asp Ala Gly Val Tyr
                100                 105                 110

Arg Cys Met Ile Ser Tyr Gly Gly Ala Asp Tyr Lys Arg Ile Thr Val
            115                 120                 125

Lys Val Asn Ala Pro Tyr Asn Lys Ile Asn Gln Arg Ile Leu Val Val
    130                 135                 140

Asp Pro Val Thr Ser Glu His Glu Leu Thr Cys Gln Ala Glu Gly Tyr
145                 150                 155                 160

Pro Lys Ala Glu Val Ile Trp Thr Ser Ser Asp His Gln Val Leu Ser
                165                 170                 175

Gly Lys Thr Thr Thr Thr Asn Ser Lys Arg Glu Glu Lys Leu Phe Asn
            180                 185                 190

Val Thr Ser Thr Leu Arg Ile Asn Thr Thr Thr Asn Glu Ile Phe Tyr
        195                 200                 205

Cys Thr Phe Arg Arg Leu Asp Pro Glu Glu Asn His Thr Ala Glu Leu
    210                 215                 220

Val Ile Pro Glu Leu Pro Leu Ala His Pro Pro Asn Glu Arg Thr His
225                 230                 235                 240

Leu Val Ile Leu Gly Ala Ile Leu Leu Cys Leu Gly Val Ala Leu Thr
                245                 250                 255

Phe Ile Phe Arg Leu Arg Lys Gly Arg Met Met Asp Val Lys Lys Cys
            260                 265                 270

Gly Ile Gln Asp Thr Asn Ser Lys Lys Gln Ser Asp Thr His Leu Glu
        275                 280                 285

Glu Thr
    290

<210> SEQ ID NO 4
<211> LENGTH: 98
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 1-46.01 template

<400> SEQUENCE: 4

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Tyr Met His Trp Val Arg Gln Ala Pro Gly Gln Gly Leu Glu Trp Met
            35                  40                  45

Gly Ile Ile Asn Pro Ser Gly Gly Ser Thr Ser Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg

<210> SEQ ID NO 5
<211> LENGTH: 95
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 1-5.01 template

<400> SEQUENCE: 5

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Ser Trp
                20                  25                  30

Leu Ala Trp Tyr Gln Gln Lys Pro Gly Lys Ala Pro Lys Leu Leu Ile
            35                  40                  45

Tyr Asp Ala Ser Ser Leu Glu Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Tyr Asn Ser Tyr Ser
                85                  90                  95

<210> SEQ ID NO 6
<211> LENGTH: 448
<212> TYPE: PRT
<213> ORGANISM: Artificial Sequence
<220> FEATURE:
<221> NAME/KEY: PEPTIDE
<222> LOCATION: ()..()
<223> OTHER INFORMATION: Heavy chain of Atezolizumab

<400> SEQUENCE: 6

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
                20                  25                  30

Trp Ile His Trp Val Arg Gln Ala Pro Gly Lys Gly Leu Glu Trp Val
            35                  40                  45

Ala Trp Ile Ser Pro Tyr Gly Gly Ser Thr Tyr Tyr Ala Asp Ser Val
        50                  55                  60

Lys Gly Arg Phe Thr Ile Ser Ala Asp Thr Ser Lys Asn Thr Ala Tyr
65                  70                  75                  80

```
Leu Gln Met Asn Ser Leu Arg Ala Glu Asp Thr Ala Val Tyr Tyr Cys
                85                  90                  95

Ala Arg Arg His Trp Pro Gly Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Ala Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
        435                 440                 445

<210> SEQ ID NO 7
<211> LENGTH: 214
<212> TYPE: PRT
<213> ORGANISM: Artificial Sequence
<220> FEATURE:
<221> NAME/KEY: PEPTIDE
<222> LOCATION: ()..()
<223> OTHER INFORMATION: Light chain of Atezolizumab
```

```
<400> SEQUENCE: 7

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Ser Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Leu Tyr His Pro Ala
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 8
<211> LENGTH: 288
<212> TYPE: PRT
<213> ORGANISM: Homo sapiens

<400> SEQUENCE: 8

Met Gln Ile Pro Gln Ala Pro Trp Pro Val Val Trp Ala Val Leu Gln
1               5                   10                  15

Leu Gly Trp Arg Pro Gly Trp Phe Leu Asp Ser Pro Asp Arg Pro Trp
            20                  25                  30

Asn Pro Pro Thr Phe Ser Pro Ala Leu Leu Val Val Thr Glu Gly Asp
        35                  40                  45

Asn Ala Thr Phe Thr Cys Ser Phe Ser Asn Thr Ser Glu Ser Phe Val
    50                  55                  60

Leu Asn Trp Tyr Arg Met Ser Pro Ser Asn Gln Thr Asp Lys Leu Ala
65                  70                  75                  80

Ala Phe Pro Glu Asp Arg Ser Gln Pro Gly Gln Asp Cys Arg Phe Arg
                85                  90                  95

Val Thr Gln Leu Pro Asn Gly Arg Asp Phe His Met Ser Val Val Arg
            100                 105                 110

Ala Arg Arg Asn Asp Ser Gly Thr Tyr Leu Cys Gly Ala Ile Ser Leu
        115                 120                 125

Ala Pro Lys Ala Gln Ile Lys Glu Ser Leu Arg Ala Glu Leu Arg Val
130                 135                 140
```

Thr Glu Arg Arg Ala Glu Val Pro Thr Ala His Pro Ser Pro Ser Pro
145                 150                 155                 160

Arg Pro Ala Gly Gln Phe Gln Thr Leu Val Val Gly Val Val Gly Gly
                165                 170                 175

Leu Leu Gly Ser Leu Val Leu Leu Val Trp Val Leu Ala Val Ile Cys
            180                 185                 190

Ser Arg Ala Ala Arg Gly Thr Ile Gly Ala Arg Arg Thr Gly Gln Pro
            195                 200                 205

Leu Lys Glu Asp Pro Ser Ala Val Pro Val Phe Ser Val Asp Tyr Gly
            210                 215                 220

Glu Leu Asp Phe Gln Trp Arg Glu Lys Thr Pro Glu Pro Pro Val Pro
225                 230                 235                 240

Cys Val Pro Glu Gln Thr Glu Tyr Ala Thr Ile Val Phe Pro Ser Gly
                245                 250                 255

Met Gly Thr Ser Ser Pro Ala Arg Arg Gly Ser Ala Asp Gly Pro Arg
            260                 265                 270

Ser Ala Gln Pro Leu Arg Pro Glu Asp Gly His Cys Ser Trp Pro Leu
            275                 280                 285

<210> SEQ ID NO 9
<211> LENGTH: 121
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 14A7-VH

<400> SEQUENCE: 9

Gln Val Gln Leu Lys Gln Ser Gly Ala Glu Leu Val Arg Pro Gly Thr
1               5                   10                  15

Ser Val Lys Met Ser Cys Lys Ala Thr Glu Tyr Thr Phe Thr Asn Asn
            20                  25                  30

Trp Ile Ala Trp Val Lys Gln Arg Pro Gly His Gly Leu Glu Trp Val
        35                  40                  45

Gly Asp Ile His Pro Gly Gly Gly Phe Thr Asn Tyr Asn Glu Lys Phe
    50                  55                  60

Lys Val Lys Ala Thr Leu Thr Ala Asp Thr Ser Ser Ser Thr Ala Tyr
65                  70                  75                  80

Met Gln Leu Arg Ser Leu Thr Ser Glu Asp Ser Ala Ile Tyr Tyr Cys
                85                  90                  95

Ala Gly Ser Lys Thr Arg Asp Tyr Asp Ala Trp Phe Ala Tyr Trp Gly
            100                 105                 110

Gln Gly Thr Leu Val Thr Val Ser Ala
        115                 120

<210> SEQ ID NO 10
<211> LENGTH: 112
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 14A7-VL

<400> SEQUENCE: 10

Asp Ile Val Met Thr Gln Ala Pro Ser Ser Leu Ala Val Ser Val Gly
1               5                   10                  15

```
Glu Lys Val Thr Leu Asn Cys Lys Ser Ser Gln Ser Leu Leu Tyr Thr
                 20                  25                  30

Gly Asn Gln Lys Asn Tyr Leu Ala Trp Tyr Gln Lys Pro Gly Gln
             35                  40                  45

Ser Pro Lys Leu Leu Ile Tyr Trp Ala Ser Thr Arg Glu Ser Gly Val
 50                  55                  60

Pro Asp Arg Phe Thr Gly Ser Gly Ser Gly Thr Asp Phe Thr Leu Thr
 65                  70                  75                  80

Ile Ser Asn Val Lys Ala Glu Asp Leu Ala Val Tyr Phe Cys Gln Gln
                 85                  90                  95

Tyr Tyr Thr Tyr Arg Thr Phe Gly Gly Gly Thr Lys Leu Glu Ile Lys
                100                 105                 110

<210> SEQ ID NO 11
<211> LENGTH: 114
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 15G10-VH

<400> SEQUENCE: 11

Gln Val Gln Leu Lys Gln Ser Gly Pro Glu Leu Val Lys Pro Gly Ala
 1               5                  10                  15

Ser Val Lys Thr Ser Cys Lys Ala Ser Gly Tyr Thr Phe Thr Asn Tyr
                 20                  25                  30

Val Val His Trp Val Lys Gln Asn Pro Gly Gln Gly Leu Glu Trp Ile
             35                  40                  45

Gly Tyr Val Asn Pro Asn Asn Asp Gly Thr Ile Phe Asn Glu Lys Phe
 50                  55                  60

Lys Asp Lys Ala Ile Leu Thr Ser Asp Lys Ser Ser Ser Thr Ala Tyr
 65                  70                  75                  80

Met Glu Leu Ser Ser Leu Thr Ser Glu Asp Ser Ala Val Tyr Tyr Cys
                 85                  90                  95

Ala Arg Ser Pro Phe Ala His Trp Gly Gln Gly Thr Leu Val Thr Val
                100                 105                 110

Ser Ala

<210> SEQ ID NO 12
<211> LENGTH: 111
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 15G10-VL

<400> SEQUENCE: 12

Gln Ile Val Leu Thr Gln Ser Pro Ala Ser Leu Thr Val Ser Leu Gly
 1               5                  10                  15

Gln Arg Ala Thr Ile Ser Cys Ser Ala Ser Glu Ser Val Asp Phe Tyr
                 20                  25                  30

Gly Thr Ser Leu Met Gln Trp Phe Gln Gln Lys Pro Gly Gln Pro Pro
             35                  40                  45

Lys Leu Leu Val Tyr Thr Ala Ser Asn Val Asp Ser Glu Val Pro Ala
 50                  55                  60

Arg Phe Ser Gly Ser Gly Ser Gly Thr Asp Phe Ser Leu Asn Ile His
 65                  70                  75                  80
```

```
Pro Val Glu Glu Asp Asp Ile Ala Met Tyr Phe Cys His Gln Thr Arg
                85                  90                  95

Lys Val Pro Tyr Thr Phe Gly Gly Gly Thr Lys Leu Glu Ile Lys
            100                 105                 110

<210> SEQ ID NO 13
<211> LENGTH: 118
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 13C9-VH

<400> SEQUENCE: 13

Gln Val Gln Leu Lys Gln Ser Gly Ala Gly Leu Val Lys Pro Gly Ala
1               5                   10                  15

Ser Val Lys Leu Ser Cys Lys Ala Ser Gly Tyr Ile Phe Thr Glu Tyr
            20                  25                  30

Ile Ile His Trp Val Lys Gln Arg Ser Gly Gln Gly Leu Glu Trp Ile
        35                  40                  45

Gly Trp Phe Tyr Pro Gly Ser Asp Asn Ile Lys Tyr Asn Glu Lys Phe
    50                  55                  60

Lys Asp Lys Ala Thr Leu Thr Ala Asp Lys Ser Ser Ser Thr Val Tyr
65                  70                  75                  80

Met Glu Leu Ser Arg Leu Thr Ser Glu Asp Ser Ala Val Tyr Phe Cys
                85                  90                  95

Ala Arg His Glu Thr Gly Tyr Phe Phe Asp Tyr Trp Gly Gln Gly Thr
            100                 105                 110

Thr Leu Thr Val Ser Ser
        115

<210> SEQ ID NO 14
<211> LENGTH: 108
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 13C9-VL

<400> SEQUENCE: 14

Asp Ile Val Ile Thr Gln Ser Pro Ala Ile Met Ser Ala Ser Pro Gly
1               5                   10                  15

Glu Lys Val Thr Met Thr Cys Ser Ala Ser Ser Ser Val Ser Lys Met
            20                  25                  30

Asn Trp Tyr Gln Gln Lys Ser Gly Thr Ser Pro Lys Arg Trp Ile Tyr
        35                  40                  45

Asp Thr Ser Lys Leu Ala Ser Gly Val Pro Ser Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Ser Asn Pro Leu Thr
                85                  90                  95

Phe Gly Ser Gly Thr Lys Leu Glu Leu Lys Arg Ala
            100                 105

<210> SEQ ID NO 15
<211> LENGTH: 118
```

```
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 18B4-VH

<400> SEQUENCE: 15

Gln Val Gln Leu Lys Gln Ser Gly Pro Glu Leu Glu Lys Pro Gly Ala
1               5                   10                  15

Ser Val Lys Ile Ser Cys Lys Ala Ser Gly Tyr Ser Phe Thr Gly Tyr
                20                  25                  30

Asn Met Asn Trp Val Lys Gln Ser Asn Gly Lys Ser Leu Glu Trp Ile
            35                  40                  45

Gly Asn Ile Asp Pro Tyr Tyr Gly Val Thr His Tyr Asn Gln Lys Phe
    50                  55                  60

Lys Gly Lys Ala Thr Leu Thr Val Asp Glu Ser Ser Ser Thr Ala Ser
65                  70                  75                  80

Met Gln Leu Lys Ser Leu Thr Ser Glu Asp Ser Ala Ile Tyr Tyr Cys
                85                  90                  95

Ala Arg Gly Ile Pro Phe Tyr Gly Leu Asp Tyr Trp Gly Gln Gly Thr
                100                 105                 110

Ser Val Thr Val Ser Ser
            115

<210> SEQ ID NO 16
<211> LENGTH: 108
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 18B4-VL

<400> SEQUENCE: 16

Gln Ile Val Leu Thr Gln Ser Pro Ala Ile Met Ser Ala Ser Pro Gly
1               5                   10                  15

Glu Lys Val Thr Met Thr Cys Gly Ala Ser Ser Ser Val Ser Phe Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Ala Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Asn Thr Asn Pro Phe Thr
                85                  90                  95

Phe Gly Ser Gly Thr Lys Leu Glu Ile Lys Arg Ala
                100                 105

<210> SEQ ID NO 17
<211> LENGTH: 118
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 28B1-VH
```

```
<400> SEQUENCE: 17

Gln Val Gln Leu Lys Gln Ser Gly Ala Glu Leu Val Lys Pro Gly Ala
1               5                   10                  15

Ser Val Met Leu Ser Cys Thr Ala Ser Ala Phe Asn Ile Asp Asp Thr
            20                  25                  30

Tyr Ile His Trp Val Lys Gln Arg Pro Glu Gln Gly Leu Glu Trp Ile
        35                  40                  45

Gly Arg Ile Asp Pro Ala Asn Gly Asn Thr Asp Tyr Asp Pro Glu Cys
    50                  55                  60

Gln Gly Lys Ala Thr Ile Thr Thr Asp Met Ser Ser Asn Thr Ala Tyr
65                  70                  75                  80

Leu Gln Leu Ser Ser Leu Thr Ser Glu Asp Thr Ala Val Tyr Phe Cys
                85                  90                  95

Ala Arg Gly Leu Arg Leu Pro Gly Leu Val Tyr Trp Gly Arg Gly Thr
            100                 105                 110

Leu Val Thr Val Ser Ala
            115

<210> SEQ ID NO 18
<211> LENGTH: 109
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 28B1-VL

<400> SEQUENCE: 18

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Asn Tyr
            20                  25                  30

Leu Asn Trp Tyr Gln Gln Lys Pro Asp Gly Thr Val Lys Leu Leu Ile
        35                  40                  45

Tyr Tyr Thr Ser Ile Leu Tyr Ser Gly Val Pro Ser Arg Phe Ser Gly
    50                  55                  60

Ser Gly Ser Gly Thr Asp Tyr Ser Leu Thr Ile Asn Thr Leu Glu Glu
65                  70                  75                  80

Glu Asp Ile Ala Thr Tyr Phe Cys Gln Gln Gly Asn Thr Leu Pro Trp
                85                  90                  95

Thr Phe Gly Gly Gly Thr Lys Leu Glu Ile Ile Arg Ala
            100                 105

<210> SEQ ID NO 19
<211> LENGTH: 118
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 22B10-VH

<400> SEQUENCE: 19

Gln Val Gln Leu Lys Gln Ser Gly Ala Glu Leu Val Lys Pro Gly Ala
1               5                   10                  15

Ser Val Glu Leu Ser Cys Thr Ala Ser Gly Phe Asn Ile Glu Asp Thr
            20                  25                  30
```

Tyr Leu His Trp Val Asn Gln Arg Pro Glu Gln Gly Leu Glu Trp Ile
            35                  40                  45

Gly Arg Ile Asp Pro Ala Asn Gly Asn Thr Tyr Tyr Asp Pro Lys Phe
        50                  55                  60

Gln Gly Lys Ala Thr Ile Thr Thr Asp Thr Ser Ser Asn Thr Ala Tyr
 65                  70                  75                  80

Leu Gln Leu Ser Arg Leu Thr Ser Glu Asp Thr Ala Val Tyr Tyr Cys
                85                  90                  95

Ala Arg Gly Leu Arg Leu Pro Gly Phe Pro Tyr Trp Gly Gln Gly Thr
            100                 105                 110

Leu Val Thr Val Ser Ala
            115

<210> SEQ ID NO 20
<211> LENGTH: 109
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 22B10-VL

<400> SEQUENCE: 20

Asp Ile Gln Met Thr Gln Thr Pro Ser Ser Leu Ser Ala Ser Leu Gly
 1               5                  10                  15

Asp Arg Val Thr Ile Ser Cys Arg Ala Ser Gln Asp Ile Ser Asn Tyr
            20                  25                  30

Leu Ser Trp Tyr Gln Gln Lys Pro Asp Gly Thr Val Lys Leu Leu Ile
        35                  40                  45

Tyr Tyr Thr Ser Ile Leu His Ser Gly Val Pro Ser Arg Phe Ser Gly
    50                  55                  60

Ser Gly Ser Gly Thr Asp Tyr Ser Leu Ala Ile Ser Asn Leu Asp Gln
 65                  70                  75                  80

Glu Asp Ile Ala Thr Tyr Phe Cys Gln Gln Gly Asn Thr Leu Pro Trp
                85                  90                  95

Thr Phe Gly Gly Gly Thr Lys Leu Glu Ile Lys Arg Ala
            100                 105

<210> SEQ ID NO 21
<211> LENGTH: 118
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 4G7-VH

<400> SEQUENCE: 21

Gln Val Gln Leu Lys Glu Ser Gly Pro Ser Leu Val Lys Pro Ser Gln
 1               5                  10                  15

Thr Leu Ser Leu Thr Cys Ser Val Thr Gly Asp Ser Ile Ile Ser Gly
            20                  25                  30

Tyr Trp Asn Trp Ile Arg Lys Phe Pro Gly Asn Glu Leu Glu Tyr Met
        35                  40                  45

Gly Tyr Ile Ser Tyr Thr Gly Ser Thr Tyr Tyr Asn Pro Ser Leu Lys
    50                  55                  60

Ser Arg Val Ser Ile Ile Arg Asp Thr Phe Lys Asn Gln Tyr Tyr Leu
 65                  70                  75                  80

```
Gln Leu Asn Ser Val Thr Thr Glu Asp Thr Ala Thr Tyr Tyr Cys Ala
                85                  90                  95

Arg Arg Gly Glu Trp Leu Leu His Phe Asp Val Trp Gly Ala Gly Thr
            100                 105                 110

Thr Val Thr Val Ser Ser
            115

<210> SEQ ID NO 22
<211> LENGTH: 113
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 4G7-VL

<400> SEQUENCE: 22

Asp Ile Val Met Thr Gln Ala Pro Ser Ser Leu Ala Val Ser Val Gly
1               5                   10                  15

Glu Lys Val Thr Val Ser Cys Lys Ser Ser Gln Ser Leu Leu Tyr Ser
            20                  25                  30

Ser Asn Gln Lys Asn Ser Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Val Lys Ala Glu Asp Leu Ala Val Tyr Tyr Cys Gln Gln
                85                  90                  95

Tyr Tyr Ser Tyr Pro Leu Thr Phe Gly Ala Gly Thr Lys Leu Glu Leu
            100                 105                 110

Lys

<210> SEQ ID NO 23
<211> LENGTH: 113
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 8A2-VH

<400> SEQUENCE: 23

Gln Val Gln Leu Lys Gln Ser Gly Pro Gly Leu Val Ala Pro Ser Gln
1               5                   10                  15

Ser Leu Ser Ile Thr Cys Thr Val Ser Gly Phe Ser Leu Thr Gly Tyr
            20                  25                  30

Gly Val Asn Trp Val Arg Gln Pro Pro Gly Lys Gly Leu Glu Trp Leu
        35                  40                  45

Gly Lys Ile Trp Gly Asp Gly Ile Thr Asp Tyr Asn Ser Ala Leu Lys
    50                  55                  60

Ser Arg Leu Ser Ile Ser Lys Asp Asn Ser Lys Ser Gln Val Phe Leu
65                  70                  75                  80

Lys Met Asn Ser Leu Gln Thr Asp Asp Thr Ala Arg Tyr Tyr Cys Ala
                85                  90                  95

Arg Asp Val Met Asp Tyr Trp Gly Gln Gly Thr Ser Val Thr Val Ser
            100                 105                 110

Ser
```

```
<210> SEQ ID NO 24
<211> LENGTH: 105
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 8A2-VL

<400> SEQUENCE: 24

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Ile Ser Tyr Met
            20                  25                  30

His Trp Tyr Gln Gln Lys Pro Gly Thr Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Glu Ser Gly Thr Ser Tyr Ser Leu Thr Ile Ser Ser Met Glu Ala Glu
65                  70                  75                  80

Asp Ala Ala Thr Tyr Tyr Cys His His Arg Ser Pro Tyr Pro Thr Phe
                85                  90                  95

Gly Ala Gly Thr Lys Leu Glu Leu Lys
            100                 105

<210> SEQ ID NO 25
<211> LENGTH: 113
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 7E5-VH

<400> SEQUENCE: 25

Gln Val Gln Leu Lys Gln Ser Gly Pro Gly Leu Val Ala Pro Ser Gln
1               5                   10                  15

Ser Leu Ser Ile Thr Cys Thr Val Ser Gly Phe Ser Leu Thr Gly Tyr
            20                  25                  30

Gly Val Asn Trp Val Arg Gln Pro Pro Gly Lys Gly Leu Glu Trp Leu
        35                  40                  45

Gly Lys Ile Trp Gly Asp Gly Ser Thr Asp Tyr Thr Ser Ala Leu Lys
    50                  55                  60

Ser Arg Leu Ser Ile Ser Lys Asp Asn Ser Lys Ser Gln Val Phe Leu
65                  70                  75                  80

Lys Val Asn Ser Leu Gln Thr Asp Asp Thr Ala Arg Tyr Tyr Cys Ala
                85                  90                  95

Arg Asp Val Met Asp Tyr Trp Gly Gln Gly Thr Ser Val Thr Val Ser
            100                 105                 110

Ser

<210> SEQ ID NO 26
<211> LENGTH: 105
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 7E5-VL
```

<400> SEQUENCE: 26

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Ile Ser Tyr Met
            20                  25                  30

His Trp Phe Gln Gln Lys Pro Gly Thr Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Glu Ser Gly Thr Ser Tyr Ser Leu Thr Ile Ser Ser Met Glu Ala Glu
65                  70                  75                  80

Asp Ala Ala Thr Tyr Tyr Cys His Gln Arg Ser Pro Tyr Pro Thr Phe
                85                  90                  95

Gly Ala Gly Thr Lys Leu Glu Leu Lys
            100                 105

<210> SEQ ID NO 27
<211> LENGTH: 113
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 2E5-VH

<400> SEQUENCE: 27

Gln Val Gln Leu Lys Gln Ser Gly Pro Gly Leu Val Ala Pro Ser Gln
1               5                   10                  15

Ser Leu Ser Ile Thr Cys Thr Val Ser Gly Phe Ser Leu Thr Gly Tyr
            20                  25                  30

Gly Val Asn Trp Val Arg Gln Pro Pro Gly Lys Gly Leu Glu Trp Leu
        35                  40                  45

Gly Lys Ile Trp Gly Asp Gly Ile Thr Asp Tyr Asn Ser Ala Leu Lys
    50                  55                  60

Ser Arg Leu Ser Ile Ser Lys Asp Asn Ser Lys Ser Gln Val Phe Leu
65                  70                  75                  80

Lys Met Asn Ser Leu Gln Thr Glu Asp Thr Ala Arg Tyr Tyr Cys Ala
                85                  90                  95

Arg Asp Val Met Asp Tyr Trp Gly Gln Gly Thr Ser Val Thr Val Ser
            100                 105                 110

Ser

<210> SEQ ID NO 28
<211> LENGTH: 112
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 2E5-VL

<400> SEQUENCE: 28

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Glu Gln Ser
            20                  25                  30

Asn Gly Asn Thr Tyr Leu Glu Trp Tyr Leu Gln Lys Pro Gly Gln Ser
        35                  40                  45

Pro Lys Val Leu Ile Tyr Lys Val Ser Asn Arg Phe Ser Gly Val Pro
            50                  55                  60

Asp Arg Phe Ser Gly Ser Gly Ser Gly Thr Asp Phe Thr Leu Lys Ile
 65                  70                  75                  80

Ser Arg Val Glu Ser Glu Asp Leu Gly Val Tyr Tyr Cys Phe Gln Gly
                 85                  90                  95

Ser His Val Pro Tyr Thr Phe Gly Gly Gly Thr Lys Leu Glu Ile Lys
            100                 105                 110

<210> SEQ ID NO 29
<211> LENGTH: 113
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 10A3-VH

<400> SEQUENCE: 29

Gln Val Gln Leu Lys Gln Ser Gly Pro Gly Leu Val Ala Pro Ser Gln
 1               5                  10                  15

Ser Leu Ser Ile Thr Cys Thr Val Ser Gly Phe Ser Leu Thr Gly Tyr
            20                  25                  30

Gly Val Asn Trp Val Arg Gln Pro Pro Gly Lys Gly Leu Glu Trp Leu
        35                  40                  45

Gly Lys Ile Trp Gly Asp Gly Ile Thr Asp Tyr Asn Ser Ala Leu Lys
    50                  55                  60

Ser Arg Leu Ser Ile Ser Lys Asp Asn Ser Lys Ser Gln Val Phe Leu
 65                  70                  75                  80

Lys Met Asn Ser Leu Gln Thr Glu Asp Thr Ala Arg Tyr Tyr Cys Ala
                 85                  90                  95

Arg Asp Val Met Asp Tyr Trp Gly Gln Gly Thr Ser Val Thr Val Ser
            100                 105                 110

Ser

<210> SEQ ID NO 30
<211> LENGTH: 107
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 10A3-VL

<400> SEQUENCE: 30

Gln Ile Val Leu Thr Gln Ser Pro Ala Ile Met Ser Ala Ser Pro Gly
 1               5                  10                  15

Glu Lys Val Thr Met Thr Cys Ser Ala Ser Ser Ile Asn Tyr Met
            20                  25                  30

His Trp Phe Gln Gln Lys Pro Gly Thr Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Glu Ser Gly Thr Ser Tyr Ser Leu Thr Ile Ser Ser Met Glu Ala Glu
 65                  70                  75                  80

Asp Ala Ala Thr Tyr Tyr Cys His His Arg Ser Pro Tyr Pro Thr Phe
                 85                  90                  95

```
Gly Ala Gly Thr Lys Leu Glu Leu Lys Arg Ala
            100                 105
```

<210> SEQ ID NO 31
<211> LENGTH: 121
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 6G5-VH

<400> SEQUENCE: 31

```
Gln Val Gln Leu Lys Gln Ser Gly Ala Glu Leu Val Arg Pro Gly Thr
1               5                   10                  15

Ser Val Lys Met Ser Cys Lys Ala Thr Glu Tyr Thr Phe Thr Asn Asn
            20                  25                  30

Trp Ile Ala Trp Val Lys Gln Arg Pro Gly His Gly Leu Glu Trp Ile
        35                  40                  45

Gly Asp Ile His Pro Gly Gly Tyr Thr Asn Tyr Asn Glu Lys Phe
    50                  55                  60

Lys Gly Lys Ala Thr Leu Thr Ala Asp Thr Ser Ser Thr Ala Tyr
65                  70                  75                  80

Met Gln Leu Ser Ser Leu Thr Ser Glu Asp Ser Ala Ile Tyr Tyr Cys
                85                  90                  95

Ala Gly Ser Lys Thr Arg Asp Tyr Asp Ser Trp Phe Ala Tyr Trp Gly
            100                 105                 110

Gln Gly Thr Leu Val Thr Val Ser Ala
        115                 120
```

<210> SEQ ID NO 32
<211> LENGTH: 108
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 6G5-VL

<400> SEQUENCE: 32

```
Asp Ile Val Ile Thr Gln Ser Pro Ala Ile Met Ser Ala Ser Pro Gly
1               5                   10                  15

Glu Lys Val Thr Met Thr Cys Ser Ala Ser Ser Ser Val Ser Lys Met
            20                  25                  30

Asn Trp Tyr Gln Gln Lys Ser Gly Thr Ser Pro Lys Arg Trp Ile Tyr
        35                  40                  45

Asp Thr Ser Lys Leu Ala Ser Gly Val Pro Ser Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Ser Asn Pro Leu Thr
                85                  90                  95

Phe Gly Ser Gly Thr Lys Leu Glu Leu Lys Arg Ala
            100                 105
```

<210> SEQ ID NO 33
<211> LENGTH: 121
<212> TYPE: PRT
<213> ORGANISM: Artificial Sequence
<220> FEATURE:

<221> NAME/KEY: PEPTIDE
<222> LOCATION: ()..()
<223> OTHER INFORMATION: 14A7-VH-hz

<400> SEQUENCE: 33

Gln Val Gln Leu Val Gln Ser Gly Ala Glu Val Lys Lys Pro Gly Ala
1               5                   10                  15

Ser Val Lys Val Ser Cys Lys Ala Ser Glu Tyr Thr Phe Thr Asn Asn
            20                  25                  30

Trp Ile Ala Trp Val Arg Gln Ala Pro Gly Gln Gly Leu Glu Trp Val
        35                  40                  45

Gly Asp Ile His Pro Gly Gly Gly Phe Thr Asn Tyr Asn Glu Lys Phe
    50                  55                  60

Lys Val Arg Ala Thr Leu Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Gly Ser Lys Thr Arg Asp Tyr Asp Ala Trp Phe Ala Tyr Trp Gly
            100                 105                 110

Gln Gly Thr Thr Val Thr Val Ser Ser
        115                 120

<210> SEQ ID NO 34
<211> LENGTH: 112
<212> TYPE: PRT
<213> ORGANISM: Artificial Sequence
<220> FEATURE:
<221> NAME/KEY: PEPTIDE
<222> LOCATION: ()..()
<223> OTHER INFORMATION: 14A7-VL-hz

<400> SEQUENCE: 34

Asp Ile Gln Met Thr Gln Ser Pro Ser Thr Leu Ser Ala Ser Val Gly
1               5                   10                  15

Asp Arg Val Thr Ile Thr Cys Lys Ser Ser Gln Ser Leu Leu Tyr Thr
            20                  25                  30

Gly Asn Gln Lys Asn Tyr Leu Ala Trp Tyr Gln Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Glu Phe Thr Leu Thr
65                  70                  75                  80

Ile Ser Ser Leu Gln Pro Asp Asp Phe Ala Thr Tyr Tyr Cys Gln Gln
                85                  90                  95

Tyr Tyr Thr Tyr Arg Thr Phe Gly Gln Gly Thr Lys Val Glu Ile Lys
            100                 105                 110

<210> SEQ ID NO 35
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 35

Glu Tyr Thr Phe Thr Asn Asn Trp Ile Ala
1               5                   10

```
<210> SEQ ID NO 36
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 36

Asp Ile His Pro Gly Gly Gly Phe Thr Asn Tyr Asn Glu Lys Phe Lys
1               5                   10                  15

Val

<210> SEQ ID NO 37
<211> LENGTH: 12
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

<400> SEQUENCE: 37

Ser Lys Thr Arg Asp Tyr Asp Ala Trp Phe Ala Tyr
1               5                   10

<210> SEQ ID NO 38
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 38

Lys Ser Ser Gln Ser Leu Leu Tyr Thr Gly Asn Gln Lys Asn Tyr Leu
1               5                   10                  15

Ala

<210> SEQ ID NO 39
<211> LENGTH: 7
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR2

<400> SEQUENCE: 39

Trp Ala Ser Thr Arg Glu Ser
1               5

<210> SEQ ID NO 40
<211> LENGTH: 8
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 40

Gln Gln Tyr Tyr Thr Tyr Arg Thr
1               5
```

```
<210> SEQ ID NO 41
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 41

Gly Tyr Thr Phe Thr Asn Tyr Val Val His
1               5                   10

<210> SEQ ID NO 42
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 42

Tyr Val Asn Pro Asn Asn Asp Gly Thr Ile Phe Asn Glu Lys Phe Lys
1               5                   10                  15

Asp

<210> SEQ ID NO 43
<211> LENGTH: 5
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

<400> SEQUENCE: 43

Ser Pro Phe Ala His
1               5

<210> SEQ ID NO 44
<211> LENGTH: 15
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 44

Ser Ala Ser Glu Ser Val Asp Phe Tyr Gly Thr Ser Leu Met Gln
1               5                   10                  15

<210> SEQ ID NO 45
<211> LENGTH: 7
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR2

<400> SEQUENCE: 45

Thr Ala Ser Asn Val Asp Ser
1               5

<210> SEQ ID NO 46
<211> LENGTH: 9
```

```
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 46

His Gln Thr Arg Lys Val Pro Tyr Thr
1               5

<210> SEQ ID NO 47
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 47

Gly Tyr Ile Phe Thr Glu Tyr Ile Ile His
1               5                   10

<210> SEQ ID NO 48
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 48

Trp Phe Tyr Pro Gly Ser Asp Asn Ile Lys Tyr Asn Glu Lys Phe Lys
1               5                   10                  15

Asp

<210> SEQ ID NO 49
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

<400> SEQUENCE: 49

His Glu Thr Gly Tyr Phe Phe Asp Tyr
1               5

<210> SEQ ID NO 50
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 50

Ser Ala Ser Ser Ser Val Ser Lys Met Asn
1               5                   10

<210> SEQ ID NO 51
<211> LENGTH: 7
<212> TYPE: PRT
<213> ORGANISM: Artificial Sequence
```

```
<220> FEATURE:
<221> NAME/KEY: PEPTIDE
<222> LOCATION: ()..()
<223> OTHER INFORMATION: L-CDR2

<400> SEQUENCE: 51

Asp Thr Ser Lys Leu Ala Ser
1               5

<210> SEQ ID NO 52
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 52

Gln Gln Trp Ser Ser Asn Pro Leu Thr
1               5

<210> SEQ ID NO 53
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 53

Gly Tyr Ser Phe Thr Gly Tyr Asn Met Asn
1               5                   10

<210> SEQ ID NO 54
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 54

Asn Ile Asp Pro Tyr Tyr Gly Val Thr His Tyr Asn Gln Lys Phe Lys
1               5                   10                  15

Gly

<210> SEQ ID NO 55
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

<400> SEQUENCE: 55

Gly Ile Pro Phe Tyr Gly Leu Asp Tyr
1               5

<210> SEQ ID NO 56
<211> LENGTH: 10
<212> TYPE: PRT
<213> ORGANISM: Artificial Sequence
<220> FEATURE:
<221> NAME/KEY: PEPTIDE
```

```
<222> LOCATION: ()..()
<223> OTHER INFORMATION: L-CDR1

<400> SEQUENCE: 56

Gly Ala Ser Ser Ser Val Ser Phe Met His
1               5                   10

<210> SEQ ID NO 57
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 57

Gln Gln Trp Asn Thr Asn Pro Phe Thr
1               5

<210> SEQ ID NO 58
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 58

Ala Phe Asn Ile Asp Asp Thr Tyr Ile His
1               5                   10

<210> SEQ ID NO 59
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 59

Arg Ile Asp Pro Ala Asn Gly Asn Thr Asp Tyr Asp Pro Glu Cys Gln
1               5                   10                  15
Gly

<210> SEQ ID NO 60
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

<400> SEQUENCE: 60

Gly Leu Arg Leu Pro Gly Leu Val Tyr
1               5

<210> SEQ ID NO 61
<211> LENGTH: 11
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1
```

<400> SEQUENCE: 61

Arg Ala Ser Gln Asp Ile Ser Asn Tyr Leu Asn
1               5                   10

<210> SEQ ID NO 62
<211> LENGTH: 7
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR2

<400> SEQUENCE: 62

Tyr Thr Ser Ile Leu Tyr Ser
1               5

<210> SEQ ID NO 63
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 63

Gln Gln Gly Asn Thr Leu Pro Trp Thr
1               5

<210> SEQ ID NO 64
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 64

Gly Phe Asn Ile Glu Asp Thr Tyr Leu His
1               5                   10

<210> SEQ ID NO 65
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 65

Arg Ile Asp Pro Ala Asn Gly Asn Thr Tyr Tyr Asp Pro Lys Phe Gln
1               5                   10                  15

Gly

<210> SEQ ID NO 66
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3

```
<400> SEQUENCE: 66

Gly Leu Arg Leu Pro Gly Phe Pro Tyr
1               5

<210> SEQ ID NO 67
<211> LENGTH: 11
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 67

Arg Ala Ser Gln Asp Ile Ser Asn Tyr Leu Ser
1               5                   10

<210> SEQ ID NO 68
<211> LENGTH: 7
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR2

<400> SEQUENCE: 68

Tyr Thr Ser Ile Leu His Ser
1               5

<210> SEQ ID NO 69
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 69

Gly Asp Ser Ile Ile Ser Gly Tyr Trp Asn
1               5                   10

<210> SEQ ID NO 70
<211> LENGTH: 16
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 70

Tyr Ile Ser Tyr Thr Gly Ser Thr Tyr Tyr Asn Pro Ser Leu Lys Ser
1               5                   10                  15

<210> SEQ ID NO 71
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3
```

```
<400> SEQUENCE: 71

Arg Gly Glu Trp Leu Leu His Phe Asp Val
1               5                   10

<210> SEQ ID NO 72
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 72

Lys Ser Ser Gln Ser Leu Leu Tyr Ser Ser Asn Gln Lys Asn Ser Leu
1               5                   10                  15

Ala

<210> SEQ ID NO 73
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 73

Gln Gln Tyr Tyr Ser Tyr Pro Leu Thr
1               5

<210> SEQ ID NO 74
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR1

<400> SEQUENCE: 74

Gly Phe Ser Leu Thr Gly Tyr Gly Val Asn
1               5                   10

<210> SEQ ID NO 75
<211> LENGTH: 16
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 75

Lys Ile Trp Gly Asp Gly Ile Thr Asp Tyr Asn Ser Ala Leu Lys Ser
1               5                   10                  15

<210> SEQ ID NO 76
<211> LENGTH: 5
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3
```

```
<400> SEQUENCE: 76

Asp Val Met Asp Tyr
1               5

<210> SEQ ID NO 77
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 77

Ser Ala Ser Ser Ser Ile Ser Tyr Met His
1               5                   10

<210> SEQ ID NO 78
<211> LENGTH: 8
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 78

His His Arg Ser Pro Tyr Pro Thr
1               5

<210> SEQ ID NO 79
<211> LENGTH: 16
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 79

Lys Ile Trp Gly Asp Gly Ser Thr Asp Tyr Thr Ser Ala Leu Lys Ser
1               5                   10                  15

<210> SEQ ID NO 80
<211> LENGTH: 8
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 80

His Gln Arg Ser Pro Tyr Pro Thr
1               5

<210> SEQ ID NO 81
<211> LENGTH: 16
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1
```

```
<400> SEQUENCE: 81

Arg Ser Ser Gln Ser Ile Glu Gln Ser Asn Gly Asn Thr Tyr Leu Glu
1               5                   10                  15

<210> SEQ ID NO 82
<211> LENGTH: 7
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR2

<400> SEQUENCE: 82

Lys Val Ser Asn Arg Phe Ser
1               5

<210> SEQ ID NO 83
<211> LENGTH: 9
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR3

<400> SEQUENCE: 83

Phe Gln Gly Ser His Val Pro Tyr Thr
1               5

<210> SEQ ID NO 84
<211> LENGTH: 10
<212> TYPE: PRT
<213> ORGANISM: Artificial Sequence
<220> FEATURE:
<221> NAME/KEY: PEPTIDE
<222> LOCATION: ()..()
<223> OTHER INFORMATION: L-CDR1

<400> SEQUENCE: 84

Ser Ala Ser Ser Ser Ile Asn Tyr Met His
1               5                   10

<210> SEQ ID NO 85
<211> LENGTH: 17
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR2

<400> SEQUENCE: 85

Asp Ile His Pro Gly Gly Gly Tyr Thr Asn Tyr Asn Glu Lys Phe Lys
1               5                   10                  15

Gly

<210> SEQ ID NO 86
<211> LENGTH: 12
<212> TYPE: PRT
<213> ORGANISM: Artificial Sequence
<220> FEATURE:
<221> NAME/KEY: PEPTIDE
<222> LOCATION: ()..()
<223> OTHER INFORMATION: H-CDR3
```

```
<400> SEQUENCE: 86

Ser Lys Thr Arg Asp Tyr Asp Ser Trp Phe Ala Tyr
1               5                   10
```

ANTI-PD-L1 ANTIBODY AND PHARMACEUTICAL USE THEREOF

CROSS-REFERENCE TO RELATED APPLICATIONS

This application is a Section 371 of International Application No. PCT/CN2019/112194, filed Oct. 21, 2019, which was published in the Chinese language on Apr. 29, 2021 under International Publication No. WO 2021/077250 A1, the disclosure of which is incorporated herein by reference in its entirety.

REFERENCE TO SEQUENCE LISTING SUBMITTED ELECTRONICALLY

This application contains a sequence listing, which is submitted electronically via EFS-Web as an ASCII formatted sequence listing with a file name "689755_3US_Sequence_Listing", creation date of Apr. 18, 2022, and having a size of 57,723 bytes. The sequence listing submitted via EFS-Web is part of the specification and is herein incorporated by reference in its entirety.

TECHNICAL FIELD

The present invention belongs to the field of biomedicine, and relates to a new anti-PD-L1 antibody or functional fragment thereof. The present invention also relates to the use of the antibody or functional fragment thereof.

BACKGROUND OF THE INVENTION

PD-L1, the encoding gene of which is also known as CD274, is a ligand molecule of the programmed death 1 (PD1) and is frequently expressed on haematopoietic cells and non-haematopoietic cells such as T cells and B cells, as well as on various types of tumor cells. PD-L1 is classified as a type 1 transmembrane protein and has immunoglobulin V-like and C-like domains. When PD-L1 interacts with its receptor molecule PD-1 as a ligand, T cell activation and the production of cytokines are inhibited. During infection or inflammation in normal tissues, this interaction is important for preventing autoimmunity by maintaining the homeostasis of the immune response. At the same time, this interaction plays a crucial role in the induction and maintenance of immune tolerance to self, and in the tumor microenvironment, it usually results in the inactivation of toxic T cells, thereby providing immune escape for tumor cells. The expression of this gene in tumor cells is considered to be one of the criteria for determining whether PD-1 or PD-L1 antibody drugs can be used in many types of human malignancies, such as melanoma and non-small cell lung cancer, etc.

At present, several PD-L1 monoclonal antibody drugs have come into the market, such as the first PD-L1 monoclonal antibody drug Atezolizumab (trade name TECENTRIQ®) developed and produced by GENETECH, a subsidiary of Roche, for the treatment of advanced bladder cancer that has failed or progressed on platinum-based chemotherapy. In 2017, the US Food and Drug Administration (FDA) expedited the approval of a new drug BAVENCIO® (Avelumab), which is for the treatment of Merkel cell carcinoma (MCC) in adults and 12-year-old children. The main component of the drug is Avelumab, which has sustained remission in metastatic Merkel cell carcinoma (mMCC). In Europe, a license application for a PD-L1 antibody biological agent for the treatment of metastatic uroepithelial carcinoma is also under priority review by the FDA. In March 2018, AstraZeneca also announced that its immunotherapy drug IMFINZI® (Durvalumab) has been officially approved by the US Food and Drug Administration (FDA) for the treatment of patients with non-surgically resectable stage III non-small cell lung cancer (NSCLC). Then, there is still an improvement space in terms of affinity and dissociation rate of the current monoclonal antibody drugs against PDL1, and according to clinical trial data, the immunogenicity of Atezolizumab drug is relatively high, resulting in more anti-antibodies production, which greatly affects the therapeutic effect of this drug.

SUMMARY OF THE INVENTION

The technical problem to be solved by the present invention is to obtain antibodies that specifically bind to human PD-L1, especially antibodies with high affinity to human PD-L1, by hybridoma screening and humanization techniques.

In view of the above technical problem, the purpose of the present invention is to provide an anti-human PD-L1 antibody or fragment thereof, and to provide uses based on the antibody or fragment thereof. The "fragment" of the antibody molecules of the present invention encompasses various functional fragments of the antibodies, e.g. antigen-binding portions thereof, such as Fab, F(ab')2 or scFv fragments. The present invention provides the following technical solutions.

In an aspect, the present invention provides an antibody or fragment thereof, which can specifically bind to PD-L1, especially human PD-L1, the amino acid sequence of which is shown in SEQ ID NO: 3. According to a specific embodiment of the present invention, the antibody of the present invention is a murine antibody obtained by using the extracellular region of human PD-L1 as shown in SEQ ID NO: 3 as an immunogen, and a chimeric antibody and a humanized antibody obtained based on the murine antibody.

Specifically, the antibody or fragment thereof provided by the present invention comprises a heavy chain variable region (VH) and a light chain variable region (VL), wherein the heavy chain variable region (VH) and light chain variable region (VL) comprises a combination of CDRs (H-CDR1, H-CDR2, H-CDR3; L-CDR1, L-CDR2, L-CDR3) selected from the followings:

(1) H-CDR1, H-CDR2 and H-CDR3 shown sequentially in SEQ ID NO: 35 (EYTFTNNWIA), SEQ ID NO: 36 (DIHPGGGFTNYNEKFKV) and SEQ ID NO: 37 (SKTRDYDAWFAY); and, L-CDR1, L-CDR2 and L-CDR3 shown sequentially in SEQ ID NO: 38 (KSSQSLLYTGNQKNYLA), SEQ ID NO: 39 (WASTRES) and SEQ ID NO: 40 (QQYYTYRT);

(2) H-CDR1, H-CDR2 and H-CDR3 shown sequentially in SEQ ID NO: 41 (GYTFTNYVVH), SEQ ID NO: 42 (YVNPNNDGTIFNEKFKD) and SEQ ID NO: 43 (SPFAH); and, L-CDR1, L-CDR2 and L-CDR3 shown sequentially in SEQ ID NO: 44 (SASESVDFYGTSLMQ), SEQ ID NO: 45 (TASNVDS) and SEQ ID NO: 46 (HQTRKVPYT);

(3) H-CDR1, H-CDR2 and H-CDR3 shown sequentially in SEQ ID NO: 47 (GYIFTEYIIH), SEQ ID NO: 48 (WFYPGSDNIKYNEKFKD) and SEQ ID NO: 49 (HETGYFFDY); and, L-CDR1, L-CDR2 and L-CDR3 shown sequentially in SEQ ID NO: 50 (SASSSVSKMN), SEQ ID NO: 51 (DTSKLAS) and SEQ ID NO: 52 (QQWSSNPLT);

(4) H-CDR1, H-CDR2 and H-CDR3 shown sequentially in SEQ ID NO: 53 (GYSFTGYNMN), SEQ ID NO: 54 (NIDPYYGVTHYNQKFKG) and SEQ ID NO: 55 (GIPFYGLDY); and, L-CDR1, L-CDR2 and L-CDR3 shown sequentially in SEQ ID NO: 56 (GASSSVSFMH), SEQ ID NO: 51 (DTSKLAS) and SEQ ID NO: 57 (QQWNTNPFT);

(5) H-CDR1, H-CDR2 and H-CDR3 shown sequentially in SEQ ID NO: 58 (AFNIDDTYIH), SEQ ID NO: 59 (RIDPANGNTDYDPECQG) and SEQ ID NO: 60 (GLRLPGLVY); and, L-CDR1, L-CDR2 and L-CDR3 shown sequentially in SEQ ID NO: 61 (RASQDISNYLN), SEQ ID NO: 62 (YTSILYS) and SEQ ID NO: 63 (QQGNTLPWT);

(6) H-CDR1, H-CDR2 and H-CDR3 shown sequentially in SEQ ID NO: 64 (GFNIEDTYLH), SEQ ID NO: 65 (RIDPANGNTYYDPKFQG) and SEQ ID NO: 66 (GLRLPGFPY); and, L-CDR1, L-CDR2 and L-CDR3 are shown sequentially in SEQ ID NO: 67 (RASQDISNYLS), SEQ ID NO: 68 (YTSILHS) and SEQ ID NO: 63 (QQGNTLPWT);

(7) H-CDR1, H-CDR2 and H-CDR3 shown sequentially in SEQ ID NO: 69 (GDSIISGYWN), SEQ ID NO: 70 (YISYTGSTYYNPSLKS) and SEQ ID NO: 71 (RGEWLLHFDV); and, L-CDR1, L-CDR2, and L-CDR3 shown sequentially in SEQ ID NO: 72 (KSSQSLLYSSNQKNSLA), SEQ ID NO: 39 (WASTRES) and SEQ ID NO: 73 (QQYYSYPLT);

(8) H-CDR1, H-CDR2 and H-CDR3 shown sequentially in SEQ ID NO: 74 (GFSLTGYGVN), SEQ ID NO: 75 (KIWGDGITDYNSALKS) and SEQ ID NO: 76 (DVMDY); and, L-CDR1, L-CDR2 and L-CDR3 shown sequentially in SEQ ID NO: 77 (SASSSISYMH), SEQ ID NO: 51 (DTSKLAS) and SEQ ID NO: 78 (HHRSPYPT);

(9) H-CDR1, H-CDR2 and H-CDR3 shown sequentially in SEQ ID NO: 74 (GFSLTGYGVN), SEQ ID NO: 79 (KIWGDGSTDYTSALKS) and SEQ ID NO: 76 (DVMDY); and, L-CDR1, L-CDR2 and L-CDR3 shown sequentially in SEQ ID NO: 77 (SASSSISYMH), SEQ ID NO: 51 (DTSKLAS) and SEQ ID NO: 80 (HQRSPYPT);

(10) H-CDR1, H-CDR2 and H-CDR3 shown sequentially in SEQ ID NO: 74 (GFSLTGYGVN), SEQ ID NO: 75 (KIWGDGITDYNSALKS) and SEQ ID NO: 76 (DVMDY); and, L-CDR1, L-CDR2 and L-CDR3 shown sequentially in SEQ ID NO: 81 (RSSQSIEQSNGNTYLE), SEQ ID NO: 82 (KVSNRFS) and SEQ ID NO: 83 (FQGSHVPYT);

(11) H-CDR1, H-CDR2 and H-CDR3 shown sequentially in SEQ ID NO: 74 (GFSLTGYGVN), SEQ ID NO: 75 (KIWGDGITDYNSALKS) and SEQ ID NO: 76 (DVMDY); and, L-CDR1, L-CDR2 and L-CDR3 shown sequentially in SEQ ID NO: 84 (SASSSINYMH), SEQ ID NO: 51 (DTSKLAS) and SEQ ID NO: 78 (HHRSPYPT);

(12) H-CDR1, H-CDR2 and H-CDR3 shown sequentially in SEQ ID NO: 35 (EYTFTNNWIA), SEQ ID NO: 85 (DIHPGGGYTNYNEKFKG) and SEQ ID NO: 86 (SKTRDYDSWFAY); and, L-CDR1, L-CDR2 and L-CDR3 shown sequentially in SEQ ID NO: 50 (SASSSVSKMN), SEQ ID NO: 51 (DTSKLAS) and SEQ ID NO: 52 (QQWSSNPLT).

The combinations of light and heavy chain CDRs provided by the present invention are derived from the antibody or fragment thereof of the present invention, and based on the amino acid sequence of the variable region contained in a given antibody or fragment thereof, those skilled in the art can routinely determine the CDRs contained therein. For example, according to a specific embodiment of the present invention, the AbM definition method is used to define the CDRs in the amino acid sequence of the variable region.

In the antibody or fragment thereof provided by the present invention, preferably, the heavy chain variable region comprises a sequence selected from the followings: the amino acid sequence as shown in SEQ ID NO: 9, SEQ ID NO: 11, SEQ ID NO: 13, SEQ ID NO: 15, SEQ ID NO: 17, SEQ ID NO: 19, SEQ ID NO: 21, SEQ ID NO: 23, SEQ ID NO: 25, SEQ ID NO: 27, SEQ ID NO: 29, SEQ ID NO: 31 or SEQ ID NO: 33, or an amino acid sequence having at least 75% identity with said amino acid sequence; and/or in the antibody or fragment thereof provided by the present invention, preferably, the light chain variable region comprises a sequence selected from the followings: the amino acid sequence as shown in SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32 or SEQ ID NO: 34, or an amino acid sequence having at least 75% identity with said amino acid sequence.

More preferably, the antibody or fragment thereof comprises a heavy chain variable region and a light chain variable region selected from the following combinations:

(1) the amino acid sequence as shown in SEQ ID NO: 9 or an amino acid sequence having at least 75% identity with the amino acid sequence as shown in SEQ ID NO: 9; and, the amino acid sequence as shown in SEQ ID NO: 10 or an amino acid sequence having at least 75% identity with the amino acid sequence as shown in SEQ ID NO: 10;

(2) the amino acid sequence as shown in SEQ ID NO: 11 or an amino acid sequence having at least 75% identity with the amino acid sequence as shown in SEQ ID NO: 11; and, the amino acid sequence as shown in SEQ ID NO: 12 or an amino acid sequence having at least 75% identity with the amino acid sequence as shown in SEQ ID NO: 12;

(3) the amino acid sequence as shown in SEQ ID NO: 13 or an amino acid sequence having at least 75% identity with the amino acid sequence as shown in SEQ ID NO: 13; and, the amino acid sequence as shown in SEQ ID NO: 14 or an amino acid sequence having at least 75% identity with the amino acid sequence as shown in SEQ ID NO: 14;

(4) the amino acid sequence as shown in SEQ ID NO: 15 or an amino acid sequence having at least 75% identity with the amino acid sequence as shown in SEQ ID NO: 15; and, the amino acid sequence as shown in SEQ ID NO: 16 or an amino acid sequence having at least 75% identity with the amino acid sequence as shown in SEQ ID NO: 16;

(5) the amino acid sequence as shown in SEQ ID NO: 17 or an amino acid sequence having at least 75% identity with the amino acid sequence as shown in SEQ ID NO: 17; and, the amino acid sequence as shown in SEQ ID NO: 18 or an amino acid sequence having at least 75% identity with the amino acid sequence as shown in SEQ ID NO: 18;

(6) the amino acid sequence as shown in SEQ ID NO: 19 or an amino acid sequence having at least 75% identity with the amino acid sequence as shown in SEQ ID NO: 19; and, the amino acid sequence as shown in SEQ ID NO: 20 or an amino acid sequence having at least 75% identity with the amino acid sequence as shown in SEQ ID NO: 20;

(7) the amino acid sequence as shown in SEQ ID NO: 21 or an amino acid sequence having at least 75% identity with the amino acid sequence as shown in SEQ ID NO: 21; and, the amino acid sequence as shown in SEQ ID NO: 22 or an amino acid sequence having at least 75% identity with the amino acid sequence as shown in SEQ ID NO: 22;

(8) the amino acid sequence as shown in SEQ ID NO: 23 or an amino acid sequence having at least 75% identity with the amino acid sequence as shown in SEQ ID NO: 23; and, the amino acid sequence as shown in SEQ ID NO: 24 or an amino acid sequence having at least 75% identity with the amino acid sequence as shown in SEQ ID NO: 24;

(9) the amino acid sequence as shown in SEQ ID NO: 25 or an amino acid sequence having at least 75% identity with the amino acid sequence as shown in SEQ ID NO: 25; and, the amino acid sequence as shown in SEQ ID NO: 26 or an amino acid sequence having at least 75% identity with the amino acid sequence as shown in SEQ ID NO: 26;

(10) the amino acid sequence as shown in SEQ ID NO: 27 or an amino acid sequence having at least 75% identity with the amino acid sequence as shown in SEQ ID NO: 27; and, the amino acid sequence as shown in SEQ ID NO: 28 or an amino acid sequence having at least 75% identity with the amino acid sequence as shown in SEQ ID NO: 28;

(11) the amino acid sequence as shown in SEQ ID NO: 29 or an amino acid sequence having at least 75% identity with the amino acid sequence as shown in SEQ ID NO: 29; and, the amino acid sequence as shown in SEQ ID NO: 30 or an amino acid sequence having at least 75% identity with the amino acid sequence as shown in SEQ ID NO: 30;

(12) the amino acid sequence as shown in SEQ ID NO: 31 or an amino acid sequence having at least 75% identity with the amino acid sequence as shown in SEQ ID NO: 31; and, the amino acid sequence as shown in SEQ ID NO: 32 or an amino acid sequence having at least 75% identity with the amino acid sequence as shown in SEQ ID NO: 32;

(13) the amino acid sequence as shown in SEQ ID NO: 33 or an amino acid sequence having at least 75% identity with the amino acid sequence as shown in SEQ ID NO: 33; and, the amino acid sequence as shown in SEQ ID NO: 34 or an amino acid sequence having at least 75% identity with the amino acid sequence as shown in SEQ ID NO: 34.

In the context of the present invention, "at least 75% identity" is any percentage identity between 75% and 100%, for example 75%, 80%, 85%, 90%, even 91%, 92%, 93%, 94%, 95%, 96%, 97%, 98% or 99% identity.

In particular, the antibody or fragment thereof of the present invention comprises at least a heavy chain variable region and a light chain variable region, both of which include the above-mentioned CDRs and spaced framework regions, and the arrangement of each domain is FR1-CDR1-FR2-CDR2-FR3-CDR3-FR4. Further optionally, the at most 25% difference in amino acid sequence resulting from the "at least 75% identity" may be present in any framework regions of the heavy chain variable region or light chain variable region, or in any domains or sequences other than the heavy chain variable region and the light chain variable region of the antibody or fragment thereof of the present invention. The difference may result from amino acid deletions, additions or substitutions at any position.

In terms of antigens, the antibody or fragment thereof of the present invention is an anti-PD-L1 antibody or fragment thereof; preferably, the antibody is in any form such as a monoclonal antibody, a single-chain antibody, a bifunctional antibody, a single-domain antibody, a nanobody, a completely or partially humanized antibody or a chimeric antibody, etc., or, the antigen-binding fragment is a half-antibody or an antigen-binding fragment of an antibody or half-antibody, such as, scFv, BsFv, dsFv, (dsFv)2, Fab, Fab', F(ab')2 or Fv; more preferably, the antibody is an IgG antibody. In addition to the variable region, the antibody or fragment thereof further comprises a human-derived or mouse-derived constant region, preferably comprises a human-derived or mouse-derived heavy chain constant region (CH) and/or light chain constant region (CL); preferably, the antibody or fragment thereof comprises a heavy chain and a light chain; more preferably, the antibody or fragment thereof comprises a heavy chain constant region selected from IgG, IgA, IgM, IgD or IgE and/or a kappa or lambda type light chain constant region.

According to a specific embodiment of the present invention, the antibody is a monoclonal antibody, preferably a murine, chimeric or humanized monoclonal antibody; preferably, the heavy chain constant region of the monoclonal antibody is of IgG1 or IgG4 subtype, and the light chain constant region is of kappa type; preferably, the heavy chain constant region of the monoclonal antibody comprises the amino acid sequence as shown in SEQ ID NO: 1 or an amino acid sequence having at least 75% identity with the amino acid sequence as shown in SEQ ID NO: 1; preferably, the light chain constant region of the monoclonal antibody comprises the amino acid sequence as shown in SEQ ID NO: 2 or an amino acid sequence having at least 75% identity with the amino acid sequence as shown in SEQ ID NO: 2.

In another aspect, the present invention also provides a nucleic acid molecule, which encodes the antibody or fragment thereof of the present invention or encodes the heavy chain CDRs, light chain CDRs, light chain variable region, heavy chain variable region, heavy chain or light chain contained in said antibody or fragment thereof.

The nucleic acid molecule of the present invention can be cloned into a vector and thereby transformed or transfected into a host cell. Thus, in a further aspect, the present invention also provides a vector, which comprises the nucleic acid molecule of the present invention. The vector can be a eukaryotic expression vector, a prokaryotic expression vector, an artificial chromosome and a phage vector, and the like. The vector or nucleic acid molecule of the present invention can be used to transform or transfect host cells for purposes such as preservation or antibody expression. Accordingly, in a further aspect, the present invention provides a host cell, which comprises the nucleic acid molecule and/or the vector of the present invention, or is transformed or transfected with the nucleic acid molecule and/or the vector of the present invention. The host cell can be any prokaryotic cells or eukaryotic cells, such as a bacterium or an insect, fungal, plant or animal cell.

The antibody or fragment thereof provided by the present invention can be obtained by any method known in the art. For example, the heavy chain variable region and/or light chain variable region of the antibody, or the heavy chain and/or light chain of the antibody, can first be obtained from the nucleic acid molecule provided by the present invention, and then assembled into an antibody with any other domain of the antibody; alternatively, under conditions wherein the host cell provided by the present invention is allowed to express the heavy chain variable region and/or light chain variable region of the antibody or the heavy chain and/or light chain of the antibody are allowed to be assembled into the antibody, culturing the host cell. Optionally, the method further comprises the step of recovering the produced antibody.

The antibody or fragment thereof, the nucleic acid molecule, the vector and/or the host cell provided by the present invention can be included in a pharmaceutical composition, and more particularly be included in a pharmaceutical formulation, thereby being used for various purposes according to practical needs. Therefore, in yet another aspect, the present invention also provides a pharmaceutical composition, which comprises the antibody or fragment thereof, the nucleic acid molecule, the vector and/or the host cell as described in the present invention, and optionally a pharmaceutically acceptable excipient.

In a further aspect, the present invention also provides use of the antibody or fragment thereof, the nucleic acid molecule, the vector, the host cell and/or the pharmaceutical composition in the preparation of a medicament for preventing or treating a disease, the disease including tumors or cancers, such as, non-small cell lung cancer, melanoma, bladder cancer, Merkel lymphoma, squamous cell carcinoma of the skin, lung cancer, Hodgkin lymphoma, kidney cancer, liver cancer, esophageal cancer, non-Hodgkin lymphoma, breast cancer, thyroid cancer, stomach cancer, colon cancer, nasopharyngeal cancer, pancreatic cancer, prostate cancer, leukemia, laryngeal cancer, oral cancer, ear and eye tumors, biliary tract cancer, gallbladder cancer, adrenal cancer, reproductive system tumors, multiple myeloma, nervous system tumors and uroepithelial cell carcinoma.

Therefore, accordingly, the present invention also provides a method for preventing or treating a disease, the method comprises administering to a subject in need thereof the antibody or fragment thereof, the nucleic acid molecule, the vector, the host cell and/or the pharmaceutical composition of the present invention, the disease including tumors or cancers, such as, non-small cell lung cancer, melanoma, bladder cancer, Merkel lymphoma, squamous cell carcinoma of the skin, lung cancer, Hodgkin lymphoma, kidney cancer, liver cancer, esophageal cancer, non-Hodgkin lymphoma, breast cancer, thyroid cancer, stomach cancer, colon cancer, nasopharyngeal cancer, pancreatic cancer, prostate cancer, leukemia, laryngeal cancer, oral cancer, ear and eye tumors, biliary tract cancer, gallbladder cancer, adrenal cancer, reproductive system tumors, multiple myeloma, nervous system tumors and uroepithelial cell carcinoma. Preferably, the subject is a mammal; more preferably, the subject is a human.

In yet another aspect, the present invention provides a kit, which comprises the antibody or fragment thereof, the nucleic acid molecule, the vector, the host cell and/or the pharmaceutical composition of the present invention. The kit can be used for therapeutic or diagnostic purposes.

Compared with the prior art, the present invention provides a novel antibody capable of binding PD-L1, especially human PD-L1, with high affinity. Compared with the existing anti-PD-L1 antibodies, the antibody of the present invention has the following characteristics: compared with the existing antibodies (Genetech's Atezolizumab (TECENTRIQ®), for example), in terms of affinity and dissociation rate for PD-L1, the antibodies screened by the present invention are all improved; at the same time, based on the murine antibodies obtained in the initial screening, the immunogenicity of the antibodies has been reduced by maximizing humanization; in addition, the pharmacodynamic experiments have demonstrated that the antibodies provided by the present invention have better tumor inhibition effects.

DESCRIPTION OF THE DRAWINGS

Hereinafter, embodiments of the present invention will be described in detail with reference to the drawings, wherein.

DETAILED DESCRIPTION OF THE INVENTION

Figure 1:
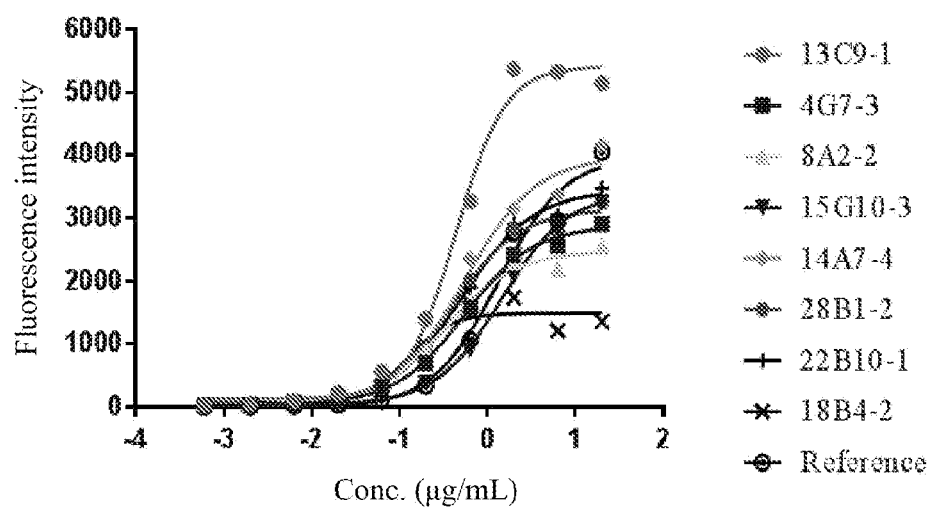
FIG. 1 shows the results of FACS detection for the binding of the culture supernatants of the hybridoma cell lines of the present invention to the antigen PD-L1.

The present invention will be described below with reference to specific examples. It will be understood by those skilled in the art that these examples are only for illustrating the present invention, and these examples do not limit the scope of the present invention in any way.

Unless otherwise specified, the experimental methods in the following examples are all conventional methods. Unless otherwise specified, the medicinal raw materials, reagent materials, etc. used in the following examples are all commercially available products.

Atezolizumab (Reference): produced by Genetech, trade name TECENTRIQ®, disclosed in US2016/0319022A1, light and heavy chains are shown in SEQ ID NO: 6 and SEQ ID NO: 7, respectively.

Example 1 Preparation of Hybridoma Cells of the Present Invention

Mice were immunized with a fusion protein containing the extracellular region (positions 19-238 of SEQ ID NO: 3) of human PD-L1 protein (GenBank Accession No. NP_054862.1, SEQ ID NO: 3) and mouse IgG2a-FC (GenBank Accession No. AAH31470.1) as the immunogen. 5 mice were immunized subcutaneously and 5 mice were immunized intramuscularly, and the adjuvant was quick antibody 5W water-soluble adjuvant, the potency was measured 2 weeks after the booster immunization and the two mice with high potency were selected for ictus immunization, and 3 days later cell fusion was performed as described below.

Two mice for fusion were obtained. Serums were obtained and then the spleens were obtained after dissection. Splenocytes were isolated and fused with cultured myeloma cells, spread into 96-well plates, while the selective medium was added for screening. The medium was changed after 7 days. ELISA detection was performed after 10 days, and those with an OD value greater than 10 times that of the negative control were selected for further flow cytometry detection.

Double-positive cells were selected, the subclones were plated on culture dishes by limiting dilution method, and monoclonal cells were selected. The culture supernatants of the selected monoclonal cells were taken for ELISA detection and flow cytometry detection, and the double-positive cells were selected for expansion culture.

Example 2 ELISA Detection for the Binding of the Culture Supernatants of Hybridoma Cells of the Present Invention to PD-L1

The fusion protein containing the extracellular region (positions 19-238 of SEQ ID NO: 3) of human PD-L1 protein (GenBank Accession No. NP_054862.1, SEQ ID NO: 3) and human IgG1-FC (GenBank Accession No. CAC20454.1) was diluted to 1-2 μg/ml with the coating buffer and then added to the wells of an ELISA plate at a density of 50-100 μl/well, and then the plate was placed at 4° C. overnight or 37° C. for 2 hours for adsorption. The liquid in the wells was discarded and the plate was washed 3 times with the washing buffer for 3-5 minutes each time, and patted dry. 200 μl of blocking buffer was added to each well and the plate was placed at 4° C. overnight or 37° C. for 2 hours for blocking. The plate was washed with the washing buffer 3 times, at which point the plate can be preserved at −20° C. or 4° C. for later use. 50-100 μl of the culture supernatant of the testing hybridoma cells was added to each well, and a positive control (added with serum from fusion mice), a negative control (added with serum from normal mice) and a blank control (added with culture medium) were set. The plate was incubated at 37° C. for 1-2 hours, washed and patted dry. Then an enzyme-labeled secondary antibody, i.e., a 1:10,000 dilution of horseradish peroxidase-labeled goat anti-mouse IgG (SIGMA, Cat. No. A9044-2 ml), was added to each well, 50-100 μl per well, the plate was incubated at 37° C. for 1-2 hours, washed and patted dry. 50-100 μl of freshly prepared chromogenic substrate solution TMB was added to each well and the plate was incubated at 37° C. for 10-30 minutes.

The reaction was terminated by adding 2 mol/L $H_2SO_4$, and the OD value was read using an ELISA plate reader.

Result determination: P/N>2:1 is considered positive (P represents the value of the positive control, N represents the value of normal mouse serum). If the negative control wells were colorless or nearly colorless, and the positive control wells were clearly colored, the results can be observed directly with the naked eye.

Example 3 FACS Detection for the Binding of the Culture Supernatant of the Hybridoma Cells of the Present Invention to PD-L1

A gene fragment of the extracellular region (positions 19-238 of SEQ ID NO: 3) of the human PD-L1 protein (GenBank Accession No. NP_054862.1, SEQ ID NO: 3) was synthesized and constructed into the PLVX virus packaging vector (Clontech, virus package mix, Cat. No. 631275) The obtained plasmid was transfected into 293T cells to package the virus which was then used to infect HEK293 cells. Puromycin was added for screening a drug-resistant cell line, i.e. HEK293 cell line stably expressing PD-L1, named 293T-h-PDL1. 293T-h-PDL1 cell line was then suspended in PBS containing 2% FBS to obtain a cell suspension with a concentration of $1 \times 10^7$ cells/ml.

50 μl of the cell suspension was placed into each flow cytometry tube (sample tube), then 50 μl of the culture supernatant of the testing hybridoma cells or the positive control antibody Atezolizumab (Reference) was added and incubated at 4° C. for 60 minutes. 1 ml of flow cytometry buffer was added to each flow cytometry tube and centrifuged at 1200 rpm for 5 minutes. The supernatant was discarded and the washing was repeated three times. At the same time, both control tube 1 (no culture supernatant and secondary antibody below, only the cell suspension was added) and control tube 2 (no culture supernatant, only cell suspension and secondary antibody below were added) were set.

Then 100 μl of flow cytometry buffer was added to each flow cytometry tube and resuspension was performed. 5 μl of PE-labelled anti-mouse Fc-tag secondary antibody (Biolegend, Cat. No. 409304) was added according to the experimental requirements, incubated at 4° C. for 30 minutes in the dark. Then 1 ml of flow cytometry buffer was added and centrifuged at 1200 rpm for 5 minutes at room temperature, the supernatant was discarded and the washing was repeated three times. 250 μl of flow cytometry buffer was added to each flow cytometry tube again, the pellet was resuspended and mixed. The resulting samples was detected by the machine.

The detection results of the FACS binding are shown in Table 1 and FIG. 1.

TABLE 1

Results of FACS detection for the binding of the culture supernatants of the hybridoma cells to PD-L1

| | EC50 (μg/mL) |
|---|---|
| 13C9-1 | 0.4401 |
| 4G7-3 | 0.543 |
| 8A2-2 | 0.336 |
| 15G10-3 | 1.45 |
| 14A7-4 | 0.5383 |
| 28B1-2 | 0.3904 |
| 22B10-1 | 0.5172 |
| 18B4-2 | 0.1249 |
| Reference | 1.33 |

The left column of the table shows the numbering of the hybridoma cell line and the numbering of subclone thereof, for example, "13C9-1" is the first clone of the subclone numbered hybridoma cell line 13C9.

Example 4 FACS Detection for Blocking the Binding of PD-L1 to Cells by the Culture Supernatants of the Hybridoma Cells of the Present Invention A gene fragment of the extracellular region (positions 24-170 of SEQ ID NO: 8) of the human PD-L1 protein (SEQ ID NO: 8) was synthesized and constructed into the PLVX-IRES-PURO vector (Clontech). The obtained plasmid was transformed into DH5α competent cells, and the cells were plated on a culture dish and incubated overnight at 37° C. Monoclonal colonies were picked, cultured in a shaking flask, and identified by enzymatic digestion. Plasmids were extracted and verified by sequencing, and the correct clones were selected for plasmid extraction and stored for later use.

293T cells were recovered and after 2 consecutive passages, the cells were spread at a density of $2 \times 10^6$ cells/10 ml/dish. After 16 h~24 h when the cell density was 70%~80%, the cells were transfected with the above eukaryotic expression plasmid and incubated at 37° C. in a 5% $CO_2$ incubator. After 12 h~16 h of incubation, the medium was discarded and changed. After 48~56 h, the corresponding amount of Puromycin was added (to a final concentration of 10 μg/ml). DMEM containing 10% FBS+10 μg/ml Puromycin was used for 10 days of continuous culture, if the cells were in good growth condition. It was preliminarily determined that polyclonal cells were obtained and flow cytometry detection was performed on these cells.

The positive polyclonal cells were taken and spread at 0.5 cells per well. After 7 days, single clones were selected and subjected to expansion culture. The selected monoclones were subjected to FACS detection and the positive cells, i.e. 293T cells stably expressing h-PD1, were selected and named as 293T-h-PD1 cells.

The cells were washed once with FACS buffer, spread into 96 deep well plate at $2-5 \times 10^5$ cells/well, and incubated for 2 hours by adding 50 μL per well of premix of hybridoma supernatant or positive control antibody Atezolizumab (Reference) and 500 ng of the fusion protein PD-L1 (hFC tag) from Example 2. Each well was then washed twice by adding 400 μl FACS buffer, PE anti-human IgG Fc secondary antibody was added and incubated for 1 hour, after which each well was washed twice by adding 400 μl FACS buffer. Detection was performed.

Figure 2:
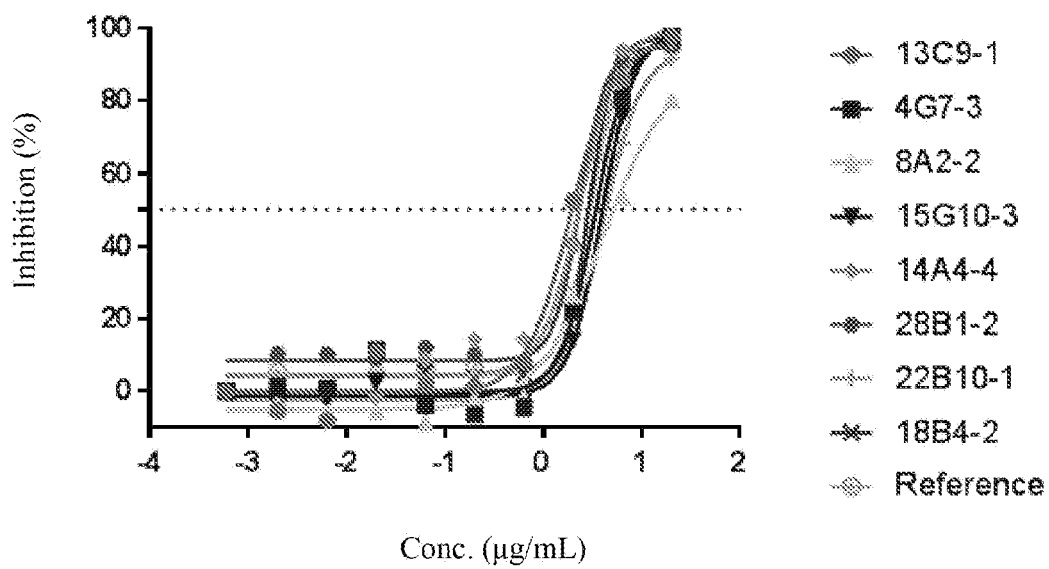
FIG. 2 shows the results of FACS detection for blocking the binding of the PD-L1 to cells by the culture supernatants of the hybridoma cells of the present invention.

The detection results of the FACS blocking are shown in Table 2 and FIG. 2.

TABLE 2

Results of FACS detection for blocking the binding of PD-L1 to cells by the culture supernatants of the hybridoma cells

|  | IC50 (μg/mL) |
| --- | --- |
| 13C9-1 | 1.95 |
| 4G7-3 | 3.42 |
| 8A2-2 | 5.17 |
| 15G10-3 | 4.00 |
| 14A7-4 | 2.31 |
| 28B1-2 | 2.31 |
| 22B10-1 | 4.31 |
| 18B4-2 | 2.89 |
| Reference | 2.97 |

Example 5 Affinity Detection for the Binding of the Culture Supernatants of the Hybridoma Cells of the Present Invention to PD-L1

Experimental Methods:

1. Capture Surface Dip of the same species and genus was selected and used.

2. A 96-well plate was obtained, and 200 μl SD buffer (1×PBS+0.02% Tween20+0.1% BSA) was added to each well, the plate was placed in ForteBio OCTET® and pre-circulated.

3. The antibody was immobilized and the concentration of the antibody after supernatant purification was 10 μg/ml.

4. The extracellular region of human PD-L1 protein (positions 19-238 of SEQ ID NO: 3) was diluted in 6 gradients of 200 nM, 100 nM, 50 nM, 25 nM, 12.5 nM and 6.25 nM, respectively, and added to the corresponding wells.

5. Detection was performed.

The results are shown in Table 3.

TABLE 3

Affinity detection results of the binding of the culture supernatants of the hybridoma cells to PD-L1

|  | After purification | | supernatants | |
| --- | --- | --- | --- | --- |
|  | KD (M) | Kdis (1/s) | KD (M) | Kdis (1/s) |
| 8A2-2 | 4.20E−06 | 1.37E−01 | 2.04E−09 | 3.40E−04 |
| 7E5-2 | 3.93E−06 | 1.10E−01 | 4.98E−10 | 1.72E−04 |
| 18B4-2 | 9.36E−07 | 1.91E−01 | 5.86E−10 | 6.62E−04 |
| 28B1-7 | 7.48E−10 | 7.23E−04 | <1.0E−12 | <1.0E−07 |
| 28B1-2 | 7.85E−10 | 7.85E−04 | 9.24E−12 | 6.26E−06 |
| 14A7-4 | 8.82E−10 | 6.47E−04 | 5.57E−11 | 2.78E−05 |
| 22B10-1 | 5.28E−10 | 4.81E−04 | 7.14E−11 | 4.43E−05 |
| 2E5-9 | 1.50E−08 | 3.76E−03 | 1.75E−10 | 5.61E−05 |
| 6G5-2 | 1.07E−09 | 8.38E−04 | 1.11E−10 | 7.94E−05 |
| 10A3-3 | 9.06E−07 | 2.96E−02 | 3.40E−10 | 5.15E−05 |
| 13C9-1 | 2.78E−09 | 1.17E−03 | 1.81E−12 | 6.32E−07 |

Based on the above experiments, corresponding hybridoma cell lines were selected. RNA was extracted from the monoclonal cells and then reverse transcribed into cDNA, which was ligated into a sequencing vector for sequencing analysis.

The sequences of exemplary murine antibodies are shown as follows, wherein the CDRs (obtained according to the AbM definition method) are underlined. The murine antibodies are named according to the hybridoma cell lines from which they are derived.

```
A1 (murine antibody 14A7)
>14A7-VH
                                   (SEQ ID NO: 9)
QVQLKQSGAELVRPGTSVKMSCKATEYTFTNNWIAWVKQRPGHGLEWVG
DIHPGGGFTNYNEKFKVKATLTADTSSSTAYMQLRSLTSEDSAIYYCAG
SKTRDYDAWFAYWGQGTLVTVSA >14A7-VL
                                   (SEQ ID NO: 10)
DIVMTQAPSSLAVSVGEKVTLNCKSSQSLLYTGNQKNYLAWYQQKPGQS
PKLLIYWASTRESGVPDRFTGSGSGTDFTLTISNVKAEDLAVYFCQQYY
TYRTFGGGTKLEIK A2 (murine antibody 15G10)
>15G10-VH
                                   (SEQ ID NO: 11)
QVQLKQSGPELVKPGASVKTSCKASGYTFTNYVVHWVKQNPGQGLEWIG
YVNPNNDGTIFNEKFKDKAILTSDKSSSTAYMELSSLTSEDSAVYYCAR
SPFAHWGQGTLVTVSA >15G10-VL
                                   (SEQ ID NO: 12)
QIVLTQSPASLTVSLGQRATISCSASESVDFYGTSLMQWFQQKPGQPPK
LLVYTASNVDSEVPARFSGSGSGTDFSLNIHPVEEDDIAMYFCHQTRKV
PYTFGGGTKLEIK A3 (murine antibody 13C9)
>13C9-VH
                                   (SEQ ID NO: 13)
QVQLKQSGAGLVKPGASVKLSCKASGYIFTEYIIHWVKQRSGQGLEWIG
WFYPGSDNIKYNEKFKDKATLTADKSSSTVYMELSRLTSEDSAVYFCAR
HETGYFFDYWGQGTTLTVSS >13C9-VL
                                   (SEQ ID NO: 14)
DIVITQSPAIMSASPGEKVTMTCSASSSVSKMNWYQQKSGTSPKRWIYD
TSKLASGVPSRFSGSGSGTSYSLTISSMEAEDAATYYCQQWSSNPLTFG
SGTKLELKRA
```

A4 (murine antibody 18B4)
>18B4-VH (SEQ ID NO: 15)
QVQLKQSGPELEKPGASVKISCKASGYSFTGYNMNWVKQSNGKSLEWIG
NIDPYYGVTHYNQKFKGKATLTVDESSSTASMQLKSLTSEDSAIYYCAR
GIPFYGLDYWGQGTSVTVSS

>18B4-VL (SEQ ID NO: 16)
QIVLTQSPAIMSASPGEKVTMTCGASSSVSFMHWYQQKSGTSPKRWIYD
TSKLASGVPARFSGSGSGTSYSLTISSMEAEDAATYYCQQWNTNPFTFG
SGTKLEIKRA

A5 (murine antibody 28B1)
>28B1-VH (SEQ ID NO: 17)
QVQLKQSGAELVKPGASVMLSCTASAFNIDDTYIHWVKQRPEQGLEWIG
RIDPANGNTDYDPECQGKATITTDMSSNTAYLQLSSLTSEDTAVYFCAR
GLRLPGLVYWGRGTLVTVSA

>28B1-VL (SEQ ID NO: 18)
DIQMTQTTSSLSASLGDRVTISCRASQDISNYLNWYQQKPDGTVKLLIY
YTSILYSGVPSRFSGSGSGTDYSLTINTLEEEDIATYFCQQGNTLPWTF
GGGTKLEIIRA

A6 (murine antibody 22B10)
>22B10-VH (SEQ ID NO: 19)
QVQLKQSGAELVKPGASVELSCTASGFNIEDTYLHWVNQRPEQGLEWIG
RIDPANGNTYYDPKFQGKATITTDTSSNTAYLQLSRLTSEDTAVYYCAR
GLRLPGFPYWGQGTLVTVSA

>22B10-VL (SEQ ID NO: 20)
DIQMTQTPSSLSASLGDRVTISCRASQDISNYLSWYQQKPDGTVKLLIY
YTSILHSGVPSRFSGSGSGTDYSLAISNLDQEDIATYFCQQGNTLPWTF
GGGTKLEIKRA

A7 (murine antibody 4G7)
>4G7-VH (SEQ ID NO: 21)
QVQLKESGPSLVKPSQTLSLTCSVTGDSIISGYWNWIRKFPGNELEYMG
YISYTGSTYYNPSLKSRVSIIRDTFKNQYYLQLNSVTTEDTATYYCARR
GEWLLHFDVWGAGTTVTVSS

>4G7-VL (SEQ ID NO: 22)
DIVMTQAPSSLAVSVGEKVTVSCKSSQSLLYSSNOKNSLAWYQQKPGQS
PKLLIYWASTRESGVPDRFTGSGSGTDFTLTISSVKAEDLAVYYCQQYY
SYPLTFGAGTKLELK

A8 (murine antibody 8A2)
>8A2-VH (SEQ ID NO: 23)
QVQLKQSGPGLVAPSQSLSITCTVSGFSLTGYGVNWVRQPPGKGLEWLG
KIWGDGITDYNSALKSRLSISKDNSKSQVFLKMNSLQTDDTARYYCARD
VMDYWGQGTSVTVSS

>8A2-VL (SEQ ID NO: 24)
QIVLTQSPAIMSASPGEKVTMTCSASSSISYMHWYQQKPGTSPKRWIYD
TSKLASGVPARFSGSESGTSYSLTISSMEAEDAATYYCHHRSPYPTFGA
GTKLELK

A9 (murine antibody 7E5)
>7E5-VH (SEQ ID NO: 25)
QVQLKQSGPGLVAPSQSLSITCTVSGFSLTGYGVNWVRQPPGKGLEWLG
KIWGDGSTDYTSALKSRLSISKDNSKSQVFLKVNSLQTDDTARYYCARD
VMDYWGQGTSVTVSS

>7E5-VL (SEQ ID NO: 26)
QIVLTQSPAIMSASPGEKVTMTCSASSSISYMHWFQQKPGTSPKRWIYD
TSKLASGVPARFSGSESGTSYSLTISSMEAEDAATYYCHQRSPYPTFGA
GTKLELK

A10 (murine antibody 2E5)
>2E5-VH (SEQ ID NO: 27)
QVQLKQSGPGLVAPSQSLSITCTVSGFSLTGYGVNWVRQPPGKGLEWLG
KIWGDGITDYNSALKSRLSISKDNSKSQVFLKMNSLQTEDTARYYCARD
VMDYWGQGTSVTVSS

>2E5-VL (SEQ ID NO: 28)
DVLMTQIPLSLPVSLGDQASISCRSSQSIEQSNGNTYLEWYLQKPGQSP
KVLIYKVSNRFSGVPDRFSGSGSGTDFTLKISRVESEDLGVYYCFQGSH
VPYTFGGGTKLEIK

A11 (murine antibody 10A3)
>10A3-VH (SEQ ID NO: 29)
QVQLKQSGPGLVAPSQSLSITCTVSGFSLTGYGVNWVRQPPGKGLEWLG
KIWGDGITDYNSALKSRLSISKDNSKSQVFLKMNSLQTEDTARYYCARD
VMDYWGQGTSVTVSS

>10A3-VL (SEQ ID NO: 30)
QIVLTQSPAIMSASPGEKVTMTCSASSSINYMHWFQQKPGTSPKRWIYD
TSKLASGVPARFSGSESGTSYSLTISSMEAEDAATYYCHHRSPYPTFGA
GTKLELKRA

A12 (murine antibody 6G5)
>6G5-VH (SEQ ID NO: 31)
QVQLKQSGAELVRPGTSVKMSCKATEYTFTNNWIAWVKQRPGHGLEWIG
DIHPGGGYTNYNEKFKGKATLTADTSSSTAYMQLSSLTSEDSAIYYCAG
SKTRDYDSWFAYWGQGTLVTVSA

>6G5-VL (SEQ ID NO: 32)
DIVITQSPAIMSASPGEKVTMTCSASSSVSKMNWYQQKSGTSPKRWIYD
TSKLASGVPSRFSGSGSGTSYSLTISSMEAEDAATYYCQQWSSNPLTFG
SGTKLELKRA

Example 6 Humanized Modification of the
Antibodies of the Present Invention

The A1 antibody (murine antibody 14A7) was selected for the humanization of the antibody. The sequence similarity between the antibody and the different human-derived templates, the expression level and whether the combination of light and heavy chains were used by the antibodies that had been drugged were considered comprehensively. According to the factors such as the similarity of the light and heavy chains with a value greater than 200, the expression level being greater than 50 mg/ml, and the combination of light and heavy chains had been used by the antibodies that had been drugged, the human-derived sequences of IGHV1-46*01 (SEQ ID NO: 4) and IGKV1-5*01 (SEQ ID NO: 5) were selected as the templates for the heavy and light chains respectively. Homology modeling of the A1 murine-derived monoclonal antibody was performed to simulate the structure of the Fab region. After homology modeling calculations, the Fab structure of the predicted A1 antibody was finally obtained.

By comparing the predicted Fab structure and heavy chain with the IGHV1-46*01 sequence, all CDR regions were replaced with human-derived templates, and then structural simulations and kinetic calculations were performed. Through structural simulation and kinetic analysis, several mouse-derived amino acids that affect the CDR structure were retained, and in the final heavy chain version, except for the CDR regions and 68A, 70L, etc., which were the original murine amino acids, all other murine-derived amino acids were replaced with the corresponding human amino acids of IGHV1-46*01 template.

By comparing the predicted Fab structure and light chain with the IGKV1-5*01 sequence, all CDR regions were replaced with human-derived templates, and then structural simulations and kinetic calculations were performed. Through structural simulation and kinetic analysis, several mouse-derived amino acids that affect the CDR structure were retained, and in the final light chain version, except for the CDR regions, which retained the original murine amino acids, all other murine-derived amino acids were replaced with the corresponding human amino acids of IGKV1-5*05 template.

The sequence of the humanized antibody of the A1 antibody is as follows:

>VH humanized sequence 14A7-VH-hz
(SEQ ID NO: 33)
QVQLVQSGAEVKKPGASVKVSCKAS<u>EYTFTNNWIAWVRQAPGQGLEWVG
DIHPGGGFTNYNEKFKV</u>RATLTADTSTSTAYMELSSLRSEDTAVYYCAG
<u>SKTRDYDAWFAY</u>WGQGTTVTVSS >VL humanized sequence 14A7-VL-hz
(SEQ ID NO: 34)
DIQMTQSPSTLSASVGDRVTITC<u>KSSQSLLYTGNQKNYLAWY</u>QQKPGKA
PKLLIY<u>WASTRES</u>GVPSRFSGSGSGTEFTLTISSLQPDDFATYYC<u>QQYY
TYRTF</u>GQGTKVEIK The sequence shown in SEQ ID NO: 1 was used as the heavy chain constant region and the sequence shown in SEQ ID NO: 2 was used as the light chain constant region. For the DNA sequence of the antibody against the PD-L1 target obtained by sequencing, the primers were redesigned. The corresponding genes for the chimeric antibody and the humanized antibody were synthesized, and ligated into eukaryotic expression vectors. The obtained plasmids were transformed into DH5alpha competent cells, and the cells were cultured overnight in a constant temperature incubator at 37° C. Monoclonal strains were selected for sequencing and identification. The strains with the correct sequence were selected, cultured in a shaking flask, and the plasmids were extracted using a MAXPREP® kit, and transfected into mammalian expression cells 293F. The cells were then placed in an incubator at 37° C. and 5% $CO_2$ for expression culture for 7 days.

The expression supernatants were collected, centrifuged, filtered, and purified by a protein G affinity chromatography column. The purified antibodies were tested for purity by SDS-PAGE electrophoresis. The antibody concentrations were measured by BCA protein assay kit, and the antibodies were dispensed and reserved at −80° C. in a refrigerator for later use. Among them, the chimeric antibody was named "murine antibody (abbreviated as chi)" and the humanized antibody was named "murine antibody (abbreviated as hz)".

Example 7 FACS Detection for the Binding of the Antibodies of the Present Invention to PD-L1

Figure 3:
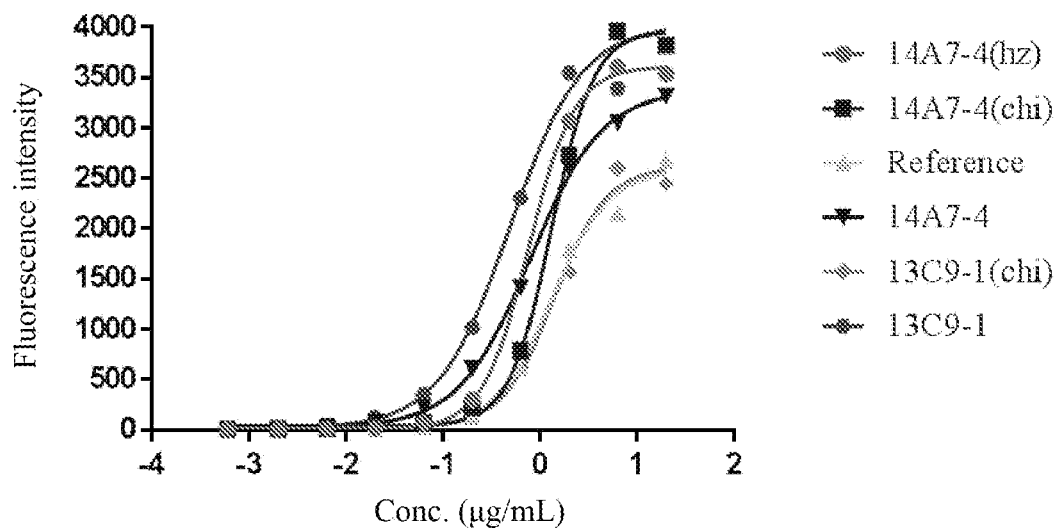
FIG. 3 shows the results of FACS detection for the binding of the antibodies of the present invention to the antigen PD-L1.

The experimental process was the same as that in Example 3, with the exception that after 50 μl of the cell suspension was placed into each flow cytometry tube, the testing antibodies, the positive control antibody (Reference) or the negative reference antibody (hIgG1) was added at the concentrations shown in FIG. 3. Control tube 1 (no antibody and secondary antibody, only cell suspension was added) and control tube 2 (no antibody, only cell suspension and secondary antibody was added) were set.

The FACS detection results for the binding are shown in Table 4 and FIG. 3.

TABLE 4

Results of FACS detection for the binding of the antibodies to PD-L1

| | EC50 (μg/mL) |
|---|---|
| 14A7-4(hz) | 0.77 |
| 14A7-4(chi) | 1.32 |
| Reference | 1.32 |
| 14A7-4 | 0.80 |
| 13C9-1(chi) | 1.42 |
| 13C9-1 | 0.49 |

Figure 4:
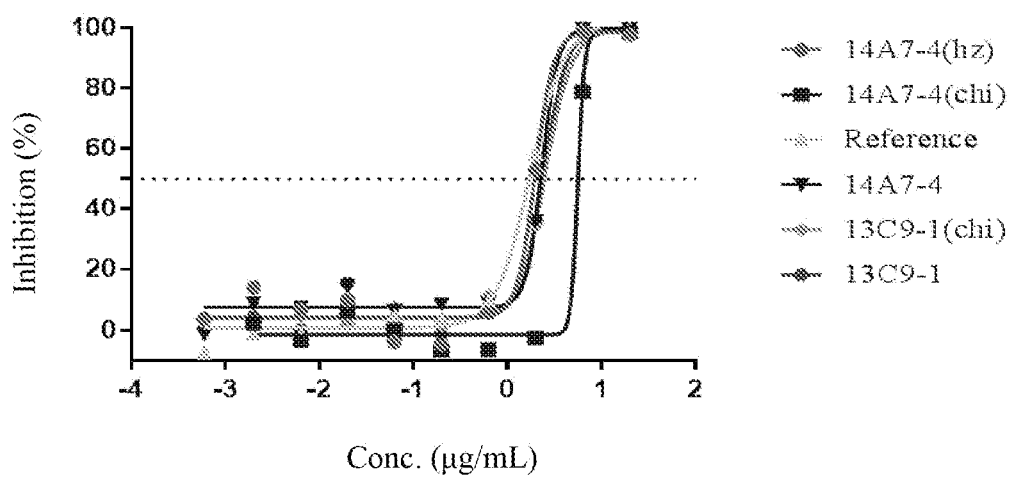
FIG. 4 shows the results of FACS detection for the antibodies of the present invention in blocking the binding of PD-L1 to cells.

Example 8 FACS Detection for Blocking the Binding of the PD-L1 to Cells by the Antibodies of the Present Invention The experimental process was referred to in Example 4, with the difference that the testing antibodies, the positive control antibody Atezolizumab (Reference) or the negative reference antibody (hIgG1) was added to each well, at the concentrations shown in FIG. 4.

The detection results of the FACS blocking are shown in Table 5 and FIG. 4.

TABLE 5

Results of FACS detection for blocking the binding of the PD-L1 to cells by the antibodies

| | IC50 (μg/mL) |
|---|---|
| 14A7-4(hz) | 1.95 |
| 14A7-4(chi) | 5.66 |
| Reference | 1.72 |
| 14A7-4 | 2.27 |
| 13C9-1(chi) | 2.47 |
| 13C9-1 | 2.38 |

Example 9 Affinity Detection for the Binding of the Antibodies of the Present Invention to PD-L1

The extracellular region of the human PD-L1 protein (positions 19-238 of SEQ ID NO: 3) was dissolved in PBS buffer to a maximum concentration of 30 nM and diluted 3-fold to 6 concentrations, and PBS buffer was used as a control. The murine antibody, chimeric antibody and humanized antibody of the present invention were dissolved in PBS to obtain 20 nM solutions.

The affinities of the antibody-antigen were determined using the ForteBio OCTET® as an affinity detection instrument. Refer to Example 5 for details of the operation method.

Figure 5:
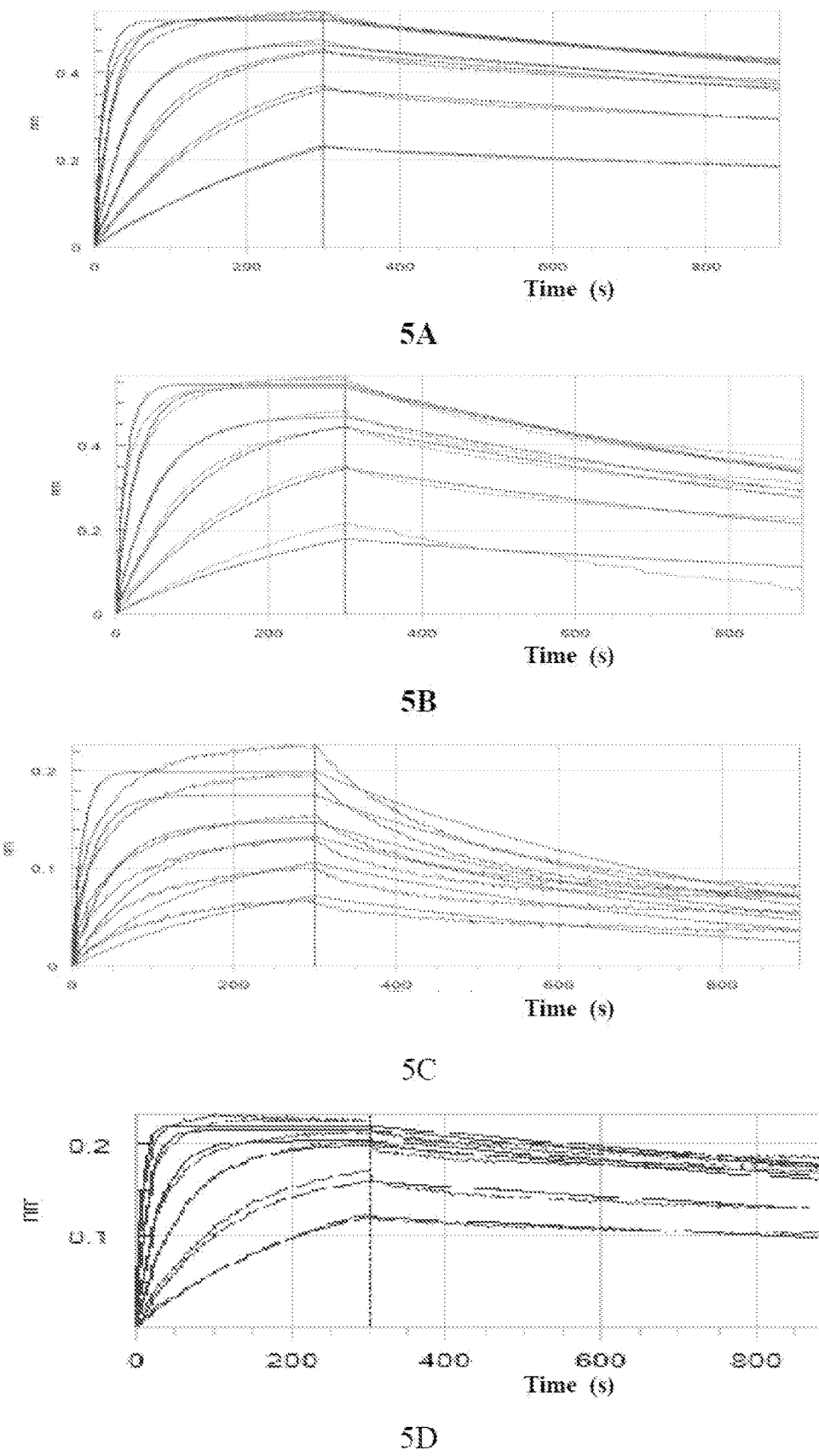
FIG. 5 shows the results of ForteBio OCTET® detection for the binding of the antibodies of the present invention to the antigen PD-L1, wherein, 5A: 14A7 (hz); 5B: Reference; 5C: 14A7 (chi); 5D: 14A7.

The experimental results are shown in Table 6 and FIG. 5.

TABLE 6

Affinity detection results of the binding of the antibodies to the antigen PD-L1

| Antibodies | Antigen | KD (M) | kdis(1/s) |
|---|---|---|---|
| Reference | Human PD-L1-his | 2.23E−09 | 7.96E−04 |
| 14A7(hz) | Human PD-L1-his | 8.84E−10 | 3.58E−04 |
| 14A7(chi) | Human PD-L1-his | 4.56E−09 | 1.73E−03 |
| 14A7 | Human PD-L1-his | 5.45E−10 | 3.59E−04 |

Example 10 In Vivo Pharmacodynamic Test of the Humanized PD-L1 Antibody of the Present Invention in Animals Referring to Example 4, a gene fragment of the extracellular region (positions 19-238 of SEQ ID NO: 3) of the human PD-L1 protein (SEQ ID NO: 3) was synthesized and constructed into the PLVX-IRES-PURO vector (Clontech) to obtain a eukaryotic expression vector carrying h-PDL1, and the plasmid was extracted.

Also referring to Example 4, with the exception that 293T cells were replaced with MC38 cells to obtain MC38 cells stably expressing h-PDL1, named MC38-h-PDL1 cells.

MC38-h-PDL1 cells were recovered and cultured in vitro to obtain 0.3X10E8 cells. Thirty 6-8 week-old male BALB/C mice were acclimatized for 1 week and weighed. Cells were inoculated according to the inoculation conditions shown in Table 7.

TABLE 7

Inoculation information of mice

| Number of animals | Inoculation location | Amount of cells inoculated/mouse | Inoculated cell suspension volume/mouse (mL) |
|---|---|---|---|
| 30 | Subcutaneous | $1 \times 10^6$ | 0.1 mL |

After inoculation, tumor volume and body weight were measured twice a week and when the mean tumor volume reached approximately 80-120 $mm^3$, the mice were randomly divided into 3 groups of 10 mice each based on tumor volume and body weight. The administration was started immediately after grouping. The start date of administration was recorded as day 0. See Table 8 for administration and grouping information.

TABLE 8

Grouping and administration information

| Group | Number of animals | Treatment | Administration dosage (mg/kg) | Administration route | Administration amount (μL) | Dosing cycle |
|---|---|---|---|---|---|---|
| 1 | 10 | Solvent | NA | Intraperitoneal | 10 | 2 doses/week, 4 doses in total |
| 2 | 10 | Atezolizumab □reference□ | 10 | Intraperitoneal | 10 | |
| 3 | 10 | 14A7(hz) | 10 | Intraperitoneal | 10 | |

Figure 6:
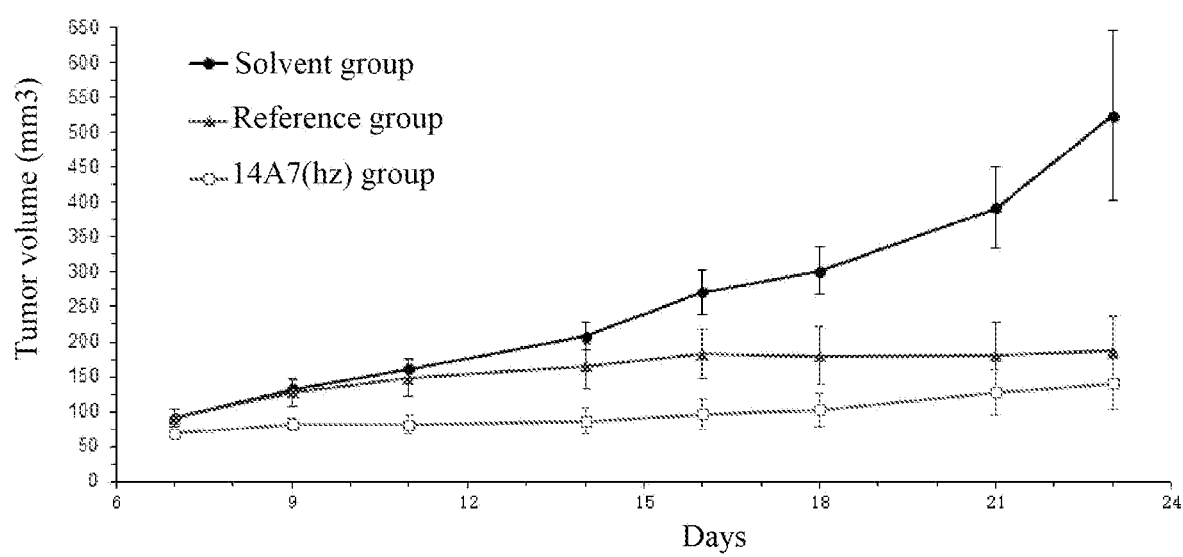
FIG. 6 shows the results of the efficacy test of the antibodies of the present invention in animals.

After the administration was started, the body weight and tumor volume of the mice were measured. The results are shown in FIG. 6.

The above description of the specific embodiments of the present invention does not limit the present invention, and various changes or modifications may be made by those skilled in the art in accordance with the present invention, which shall fall within the scope of the claims appended to the present invention as long as they do not depart from the spirit of the present invention.

The invention claimed is:

1. An antibody or fragment thereof, which comprises a heavy chain variable region (VH) and a light chain variable region (VL), wherein the heavy chain variable region (VH) and light chain variable region (VL) comprise a combination of CDRs selected from the following:

(1) H-CDR1, H-CDR2 and H-CDR3 shown sequentially in SEQ ID NO: 35, SEQ ID NO: 36, and SEQ ID NO: 37; and, L-CDR1, L-CDR2 and L-CDR3 shown sequentially in SEQ ID NO: 38, SEQ ID NO: 39, and SEQ ID NO: 40;

(2) H-CDR1, H-CDR2 and H-CDR3 shown sequentially in SEQ ID NO: 41, SEQ ID NO: 42 and SEQ ID NO: 43; and, L-CDR1, L-CDR2 and L-CDR3 shown sequentially in SEQ ID NO: 44, SEQ ID NO: 45 and SEQ ID NO: 46;

(3) H-CDR1, H-CDR2 and H-CDR3 shown sequentially in SEQ ID NO: 47, SEQ ID NO: 48 and SEQ ID NO: 49; and, L-CDR1, L-CDR2 and L-CDR3 shown sequentially in SEQ ID NO: 50, SEQ ID NO: 51 and SEQ ID NO: 52;

(4) H-CDR1, H-CDR2 and H-CDR3 shown sequentially in SEQ ID NO: 53, SEQ ID NO: 54 and SEQ ID NO: 55; and, L-CDR1, L-CDR2 and L-CDR3 shown sequentially in SEQ ID NO: 56, SEQ ID NO: 51 and SEQ ID NO: 57;

(5) H-CDR1, H-CDR2 and H-CDR3 shown sequentially in SEQ ID NO: 58, SEQ ID NO: 59 and SEQ ID NO: 60; and, L-CDR1, L-CDR2 and L-CDR3 shown sequentially in SEQ ID NO: 61, SEQ ID NO: 62 and SEQ ID NO: 63;

(6) H-CDR1, H-CDR2 and H-CDR3 shown sequentially in SEQ ID NO: 64, SEQ ID NO: 65 and SEQ ID NO: 66; and, L-CDR1, L-CDR2 and L-CDR3 shown sequentially in SEQ ID NO: 67, SEQ ID NO: 68 and SEQ ID NO: 63;

(7) H-CDR1, H-CDR2 and H-CDR3 shown sequentially in SEQ ID NO: 69, SEQ ID NO: 70 and SEQ ID NO: 71; and, L-CDR1, L-CDR2 and L-CDR3 shown sequentially in SEQ ID NO: 72, SEQ ID NO: 39 and SEQ ID NO: 73;

(8) H-CDR1, H-CDR2 and H-CDR3 shown sequentially in SEQ ID NO: 74, SEQ ID NO: 75 and SEQ ID NO: 76; and, L-CDR1, L-CDR2 and L-CDR3 shown sequentially in SEQ ID NO: 77, SEQ ID NO: 51 and SEQ ID NO: 78;

(9) H-CDR1, H-CDR2 and H-CDR3 shown sequentially in SEQ ID NO: 74, SEQ ID NO: 79 and SEQ ID NO: 76; and, L-CDR1, L-CDR2 and L-CDR3 shown sequentially in SEQ ID NO: 77, SEQ ID NO: 51 and SEQ ID NO: 80;

(10) H-CDR1, H-CDR2 and H-CDR3 shown sequentially in SEQ ID NO: 74, SEQ ID NO: 75 and SEQ ID NO: 76; and, L-CDR1, L-CDR2 and L-CDR3 shown sequentially in SEQ ID NO: 81, SEQ ID NO: 82 and SEQ ID NO: 83;

(11) H-CDR1, H-CDR2 and H-CDR3 shown sequentially in SEQ ID NO: 74, SEQ ID NO: 75 and SEQ ID NO: 76; and, L-CDR1, L-CDR2 and L-CDR3 shown sequentially in SEQ ID NO: 84, SEQ ID NO: 51 and SEQ ID NO: 78;

(12) H-CDR1, H-CDR2 and H-CDR3 shown sequentially in SEQ ID NO: 35, SEQ ID NO: 85 and SEQ ID NO: 86; and, L-CDR1, L-CDR2 and L-CDR3 shown sequentially in SEQ ID NO: 50, SEQ ID NO: 51 and SEQ ID NO: 52.

2. The antibody or fragment thereof according to claim 1, wherein the heavy chain variable region comprises a sequence selected from the following:

the amino acid sequence as shown in SEQ ID NO: 9, SEQ ID NO: 11, SEQ ID NO: 13, SEQ ID NO: 15, SEQ ID NO: 17, SEQ ID NO: 19, SEQ ID NO: 21, SEQ ID NO: 23, SEQ ID NO: 25, SEQ ID NO: 27, SEQ ID NO: 29, SEQ ID NO: 31 or SEQ ID NO: 33, and an amino acid sequence having at least 75% identity with said amino acid sequence; and/or the light chain variable region comprises a sequence selected from the following:

the amino acid sequence as shown in SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32 or SEQ ID NO: 34, and an amino acid sequence having at least 75% identity with said amino acid sequence.

3. The antibody or fragment thereof according to claim 1, wherein the antibody or fragment thereof comprises a heavy chain variable region and a light chain variable region selected from the following combinations:

(1) the amino acid sequence as shown in SEQ ID NO: 9 or an amino acid sequence having at least 75% identity with the amino acid sequence as shown in SEQ ID NO: 9; and, the amino acid sequence as shown in SEQ ID NO: 10 or an amino acid sequence having at least 75% identity with the amino acid sequence as shown in SEQ ID NO: 10;

(2) the amino acid sequence as shown in SEQ ID NO: 11 or an amino acid sequence having at least 75% identity with the amino acid sequence as shown in SEQ ID NO: 11; and, the amino acid sequence as shown in SEQ ID NO: 12 or an amino acid sequence having at least 75% identity with the amino acid sequence as shown in SEQ ID NO: 12;

(3) the amino acid sequence as shown in SEQ ID NO: 13 or an amino acid sequence having at least 75% identity with the amino acid sequence as shown in SEQ ID NO: 13; and, the amino acid sequence as shown in SEQ ID NO: 14 or an amino acid sequence having at least 75% identity with the amino acid sequence as shown in SEQ ID NO: 14;

(4) the amino acid sequence as shown in SEQ ID NO: 15 or an amino acid sequence having at least 75% identity with the amino acid sequence as shown in SEQ ID NO: 15; and, the amino acid sequence as shown in SEQ ID NO: 16 or an amino acid sequence having at least 75% identity with the amino acid sequence as shown in SEQ ID NO: 16;

(5) the amino acid sequence as shown in SEQ ID NO: 17 or an amino acid sequence having at least 75% identity with the amino acid sequence as shown in SEQ ID NO: 17; and, the amino acid sequence as shown in SEQ ID NO: 18 or an amino acid sequence having at least 75% identity with the amino acid sequence as shown in SEQ ID NO: 18;

(6) the amino acid sequence as shown in SEQ ID NO: 19 or an amino acid sequence having at least 75% identity with the amino acid sequence as shown in SEQ ID NO: 19; and, the amino acid sequence as shown in SEQ ID NO: 20 or an amino acid sequence having at least 75% identity with the amino acid sequence as shown in SEQ ID NO: 20;

(7) the amino acid sequence as shown in SEQ ID NO: 21 or an amino acid sequence having at least 75% identity with the amino acid sequence as shown in SEQ ID NO: 21; and, the amino acid sequence as shown in SEQ ID NO: 22 or an amino acid sequence having at least 75% identity with the amino acid sequence as shown in SEQ ID NO: 22;

(8) the amino acid sequence as shown in SEQ ID NO: 23 or an amino acid sequence having at least 75% identity with the amino acid sequence as shown in SEQ ID NO: 23; and, the amino acid sequence as shown in SEQ ID NO: 24 or an amino acid sequence having at least 75% identity with the amino acid sequence as shown in SEQ ID NO: 24;

(9) the amino acid sequence as shown in SEQ ID NO: 25 or an amino acid sequence having at least 75% identity with the amino acid sequence as shown in SEQ ID NO: 25; and, the amino acid sequence as shown in SEQ ID NO: 26 or an amino acid sequence having at least 75% identity with the amino acid sequence as shown in SEQ ID NO: 26;

(10) the amino acid sequence as shown in SEQ ID NO: 27 or an amino acid sequence having at least 75% identity with the amino acid sequence as shown in SEQ ID NO: 27; and, the amino acid sequence as shown in SEQ ID NO: 28 or an amino acid sequence having at least 75% identity with the amino acid sequence as shown in SEQ ID NO: 28;

(11) the amino acid sequence as shown in SEQ ID NO: 29 or an amino acid sequence having at least 75% identity with the amino acid sequence as shown in SEQ ID NO: 29; and, the amino acid sequence as shown in SEQ ID NO: 30 or an amino acid sequence having at least 75% identity with the amino acid sequence as shown in SEQ ID NO: 30;

(12) the amino acid sequence as shown in SEQ ID NO: 31 or an amino acid sequence having at least 75% identity with the amino acid sequence as shown in SEQ ID NO: 31; and, the amino acid sequence as shown in SEQ ID NO: 32 or an amino acid sequence having at least 75% identity with the amino acid sequence as shown in SEQ ID NO: 32;

(13) the amino acid sequence as shown in SEQ ID NO: 33 or an amino acid sequence having at least 75% identity with the amino acid sequence as shown in SEQ ID NO: 33; and, the amino acid sequence as shown in SEQ ID NO: 34 or an amino acid sequence having at least 75% identity with the amino acid sequence as shown in SEQ ID NO: 34.

4. The antibody or fragment thereof according to claim 1, wherein the antibody or fragment thereof is an anti-PD-L1 antibody or fragment thereof.

5. The antibody or fragment thereof according to claim 1, wherein the antibody or fragment thereof further comprises a human-derived or mouse-derived constant region.

6. The antibody or fragment thereof according to claim 1, wherein the antibody is a monoclonal antibody.

7. A nucleic acid molecule, which encodes the antibody or fragment thereof according to claim 1 or encodes the heavy chain CDRs, light chain CDRs, light chain variable region, heavy chain variable region, heavy chain or light chain contained in said antibody or fragment thereof.

8. A vector, which comprises the nucleic acid molecule according to claim 7.

9. A host cell, which comprises the nucleic acid molecule according to claim 7, or is transformed or transfected with the nucleic acid molecule according to claim 7.

10. A pharmaceutical composition, which comprises the antibody or fragment thereof according to claim 1, a nucleic acid molecule encoding said antibody or fragment thereof, a vector comprising said nucleic acid molecule, or a host cell comprising said nucleic acid molecule and/or said vector or which is transformed or transfected with said nucleic acid molecule and/or said vector, and optionally a pharmaceutically acceptable excipient.

11. A method for treating a disease, which comprises administering to a subject in need thereof the antibody or fragment thereof according to claim 1, a nucleic acid molecule encoding said antibody or fragment thereof, a vector comprising said nucleic acid molecule, a host cell comprising said nucleic acid molecule and/or said vector or which is transformed or transfected with said nucleic acid molecule and/or said vector, or a pharmaceutical composition comprising said antibody or fragment thereof, a vector comprising said nucleic acid molecule or a host cell comprising said nucleic acid molecule and/or said vector or which is transformed or transfected with said nucleic acid molecule and/or said vector, the disease including tumors or cancers; or the disease including non-small cell lung cancer, melanoma, bladder cancer, Merkel lymphoma, squamous cell carcinoma of the skin, lung cancer, Hodgkin lymphoma, kidney cancer, liver cancer, esophageal cancer, non-Hodgkin lymphoma, breast cancer, thyroid cancer, stomach cancer, colon cancer, nasopharyngeal cancer, pancreatic cancer, prostate cancer, leukemia, laryngeal cancer, oral cancer, ear and eye tumors, biliary tract cancer, gallbladder cancer, adrenal cancer, reproductive system tumors, multiple myeloma, nervous system tumors and uroepithelial cell carcinoma.

12. A kit, which comprises the antibody or fragment thereof according to claim 1, a nucleic acid molecule encoding said antibody or fragment thereof, a vector comprising said nucleic acid molecule, a host cell comprising said nucleic acid molecule and/or said vector or which is transformed or transfected with said nucleic acid molecule and/or said vector, or a pharmaceutical composition comprising said antibody or fragment thereof, a vector comprising said nucleic acid molecule or a host cell comprising said nucleic acid molecule and/or said vector or which is transformed or transfected with said nucleic acid molecule and/or said vector.

13. The antibody or fragment thereof according to claim 2, wherein the antibody or fragment thereof comprises a heavy chain variable region and a light chain variable region selected from the following combinations:

(1) the amino acid sequence as shown in SEQ ID NO: 9 or an amino acid sequence having at least 75% identity with the amino acid sequence as shown in SEQ ID NO: 9; and, the amino acid sequence as shown in SEQ ID NO: 10 or an amino acid sequence having at least 75% identity with the amino acid sequence as shown in SEQ ID NO: 10;

(2) the amino acid sequence as shown in SEQ ID NO: 11 or an amino acid sequence having at least 75% identity with the amino acid sequence as shown in SEQ ID NO: 11; and, the amino acid sequence as shown in SEQ ID NO: 12 or an amino acid sequence having at least 75% identity with the amino acid sequence as shown in SEQ ID NO: 12;

(3) the amino acid sequence as shown in SEQ ID NO: 13 or an amino acid sequence having at least 75% identity with the amino acid sequence as shown in SEQ ID NO: 13; and, the amino acid sequence as shown in SEQ ID NO: 14 or an amino acid sequence having at least 75% identity with the amino acid sequence as shown in SEQ ID NO: 14;

(4) the amino acid sequence as shown in SEQ ID NO: 15 or an amino acid sequence having at least 75% identity with the amino acid sequence as shown in SEQ ID NO: 15; and, the amino acid sequence as shown in SEQ ID NO: 16 or an amino acid sequence having at least 75% identity with the amino acid sequence as shown in SEQ ID NO: 16;

(5) the amino acid sequence as shown in SEQ ID NO: 17 or an amino acid sequence having at least 75% identity with the amino acid sequence as shown in SEQ ID NO: 17; and, the amino acid sequence as shown in SEQ ID NO: 18 or an amino acid sequence having at least 75% identity with the amino acid sequence as shown in SEQ ID NO: 18;

(6) the amino acid sequence as shown in SEQ ID NO: 19 or an amino acid sequence having at least 75% identity with the amino acid sequence as shown in SEQ ID NO: 19; and, the amino acid sequence as shown in SEQ ID NO: 20 or an amino acid sequence having at least 75% identity with the amino acid sequence as shown in SEQ ID NO: 20;

(7) the amino acid sequence as shown in SEQ ID NO: 21 or an amino acid sequence having at least 75% identity with the amino acid sequence as shown in SEQ ID NO: 21; and, the amino acid sequence as shown in SEQ ID NO: 22 or an amino acid sequence having at least 75% identity with the amino acid sequence as shown in SEQ ID NO: 22;

(8) the amino acid sequence as shown in SEQ ID NO: 23 or an amino acid sequence having at least 75% identity with the amino acid sequence as shown in SEQ ID NO: 23; and, the amino acid sequence as shown in SEQ ID NO: 24 or an amino acid sequence having at least 75% identity with the amino acid sequence as shown in SEQ ID NO: 24;

(9) the amino acid sequence as shown in SEQ ID NO: 25 or an amino acid sequence having at least 75% identity with the amino acid sequence as shown in SEQ ID NO: 25; and, the amino acid sequence as shown in SEQ ID NO: 26 or an amino acid sequence having at least 75% identity with the amino acid sequence as shown in SEQ ID NO: 26;

(10) the amino acid sequence as shown in SEQ ID NO: 27 or an amino acid sequence having at least 75% identity with the amino acid sequence as shown in SEQ ID NO: 27; and, the amino acid sequence as shown in SEQ ID NO: 28 or an amino acid sequence having at least 75% identity with the amino acid sequence as shown in SEQ ID NO: 28;

(11) the amino acid sequence as shown in SEQ ID NO: 29 or an amino acid sequence having at least 75% identity with the amino acid sequence as shown in SEQ ID NO: 29; and, the amino acid sequence as shown in SEQ ID NO: 30 or an amino acid sequence having at least 75% identity with the amino acid sequence as shown in SEQ ID NO: 30;

(12) the amino acid sequence as shown in SEQ ID NO: 31 or an amino acid sequence having at least 75% identity with the amino acid sequence as shown in SEQ ID NO: 31; and, the amino acid sequence as shown in SEQ ID NO: 32 or an amino acid sequence having at least 75% identity with the amino acid sequence as shown in SEQ ID NO: 32;

(13) the amino acid sequence as shown in SEQ ID NO: 33 or an amino acid sequence having at least 75% identity with the amino acid sequence as shown in SEQ ID NO: 33; and, the amino acid sequence as shown in SEQ ID NO: 34 or an amino acid sequence having at least 75% identity with the amino acid sequence as shown in SEQ ID NO: 34.

14. The antibody or fragment thereof according to claim 2, wherein the antibody or fragment thereof is an anti-PD-L1 antibody or fragment thereof.

15. The antibody or fragment thereof according to claim 3, wherein the antibody or fragment thereof is an anti-PD-L1 antibody or fragment thereof.

16. The antibody or fragment thereof according to claim 2, wherein the antibody or fragment thereof further comprises a human-derived or mouse-derived constant region.

17. The antibody or fragment thereof according to claim 2, wherein the antibody is a monoclonal antibody.

18. The antibody or fragment thereof according to claim 3, wherein the antibody is a monoclonal antibody.

19. The antibody or fragment thereof according to claim 4, wherein the antibody is a monoclonal antibody.

20. The antibody or fragment thereof according to claim 5, wherein the antibody is a monoclonal antibody.

21. The antibody or fragment thereof according to claim 4, wherein the antibody is in any form including a monoclonal antibody, a single-chain antibody, a bifunctional antibody, a single-domain antibody, a nanobody, a completely or partially humanized antibody or a chimeric antibody; or the antibody is an IgG antibody; or the antigen-binding fragment is a half-antibody or an antigen-binding fragment of an antibody or half-antibody; or the antigen-binding fragment is scFv, BsFv, dsFv, (dsFv) 2, Fab, Fab', F(ab')2 or Fv.

22. The antibody or fragment thereof according to claim 5, wherein the antibody or fragment thereof comprises a human-derived or mouse-derived heavy chain constant region (CH) and/or a light chain constant region (CL); or the antibody or fragment thereof comprises a heavy chain and a light chain; or the antibody or fragment thereof comprises a heavy chain constant region selected from IgG, IgA, IgM, IgD or IgE and/or a kappa or lambda type light chain constant region.

23. The antibody or fragment thereof according to claim 6, wherein the antibody is a murine, chimeric or humanized monoclonal antibody; or the heavy chain constant region of the monoclonal antibody is of IgG1 or IgG4 subtype, and the light chain constant region is of kappa type; or the heavy chain constant region of the monoclonal antibody comprises the amino acid sequence as shown in SEQ ID NO: 1 or an amino acid sequence having at least 75% identity with the amino acid sequence as shown in SEQ ID NO: 1, and/or the light chain constant region of the monoclonal antibody comprises the amino acid sequence as shown in SEQ ID NO: 2 or an amino acid sequence having at least 75% identity with the amino acid sequence as shown in SEQ ID NO: 2.

* * * * *